United States Patent [19]

Savage et al.

[11] Patent Number: 4,797,600
[45] Date of Patent: Jan. 10, 1989

[54] MAGNETIC DRIVE CONTROL SYSTEM FOR A MULTIPLE COOLING FAN INSTALLATION

[75] Inventors: Jack W. Savage, Centerville; John R. Savage, Kettering, both of Ohio

[73] Assignee: General Motors Corporation, Detroit, Mich.

[21] Appl. No.: 126,025

[22] Filed: Nov. 27, 1987

[51] Int. Cl.[4] .................. F16D 3/00; H02P 6/02
[52] U.S. Cl. ......................... 318/254; 318/9; 318/558; 123/41.49; 464/29
[58] Field of Search ............ 123/41.11, 41.12, 41.49, 123/41.65, 41.66; 180/68.1; 236/34, 35; 415/172 A, 198.1, 199.1, 199.5, 199.6, 213 C; 416/3, 30, 33, 34, 99, 168 R, 169 A, 170 R, 175, 212 R, 241; 464/29; 318/9, 41, 85, 254, 396, 558, 632

[56] References Cited

U.S. PATENT DOCUMENTS

| | | | |
|---|---|---|---|
| 2,559,416 | 7/1951 | Findley | 310/96 X |
| 2,885,873 | 5/1959 | Beeston | 464/29 |
| 2,943,216 | 6/1960 | Spodig | 464/29 X |
| 3,458,122 | 7/1969 | Andriussi et al. | 416/170 R |
| 3,715,171 | 2/1973 | Kettner | 416/3 |
| 4,459,087 | 7/1984 | Barge | 417/356 |
| 4,658,595 | 4/1987 | Shimada et al. | 236/35 X |

FOREIGN PATENT DOCUMENTS 0533777 10/1976 U.S.S.R. ................ 464/29

Primary Examiner—Bentsu Ro
Attorney, Agent, or Firm—Mark A. Navarre

[57] ABSTRACT

A multiple cooling fan installation in which a master fan is driven by a brushless electric drive motor, and at least one slave fan having blades positioned adjacent the blades of the master fan is driven by magnetic coupling between such adjacent blades. Synchronism of rotation between the master and slave fans is ensured by generating a speed command $N_{cmd}$ for the master fan drive motor in relation to position feedback from the slave fan(s) so that the speed of the master fan is increased in relation to the ability of the slave fan(s) to follow in step with the master fan.

14 Claims, 21 Drawing Sheets

MAGNETIC DRIVE CONTROL SYSTEM FOR A MULTIPLE COOLING FAN INSTALLATION

This invention relates to engine cooling fan installations, and more particularly to a magnetic drive control system for installations requiring multiple side-by-side fans.

BACKGROUND OF THE INVENTION

Due to the influence of aerodynamic and styling considerations, there has been a trend in the passenger car industry toward the use of relatively low aspect ratio (height/width) engine heat exchanger cores (radiators). Consequently, engine cooling fan diameters have been reduced and multiple side-by-side fan arrangements have been used to provide adequate airflow across the core. Installations including as many as three side-by-side fans have been proposed.

Two drive configurations have been used in the multiple fan installations referred to above. The first configuration employs separate, independent electric drives for each fan. The fans may be operated independently or in unison, as desired. The obvious disadvantage of this configuration is the expense of an additional motor and controller, as compared with single fan installations.

The second configuration employs a single electric drive for one of the fans, the fans being mechanically coupled by a drive belt. This configuration is less expensive than the first configuration, but has a number of packaging and operating disadvantages, including reduced ram cooling of the engine and belt maintenance. The ram cooling is reduced because belt coupled fans tend not to freewheel when deenergized at low vehicle speeds. The belt maintenance concerns relate primarily to belt slippage and breakage. In the event of belt breakage, the cooling capacity of the system is effectively halved. In installations in which the fan blades are interleaved, belt breakage or slippage is even more serious because the blades could become seriously damaged from the resulting mechanical interference.

SUMMARY OF THE PRESENT INVENTION

The present invention is directed to an improved multiple fan installation including one fan (master) which is directly driven by an electric motor, and at least one other fan (slave) having blades positioned adjacent the blades of the master fan, the slave fan(s) being driven by magnetic coupling between the respective fan blades. In the preferred embodiment, the magnetic coupling is provided by insert molding high energy magnets into the fan blades of both master and slave fans. When the master fan rotates, the slave fan(s) rotates due to the magnetic coupling. The fan blades counterrotate whether the mutual magnetic force is repulsive or attractive.

Synchronism of rotation is ensured by generating a speed command $N_{cmd}$ for the drive motor in relation to position feedback from the slave fan(s). In this way, the speed of the master fan is increased in relation to the ability of the slave fan(s) to follow in step with the master fan. In the preferred embodiment, the master fan is driven by a brushless DC motor and the running speed of the fans may be controlled by regulating the motor winding energy.

The master and slave fans may be positioned in the same plane (coplanar) or in offset planes as desired. In the coplanar embodiment, the fan blades may overlap somewhat to increase the magnetic coupling and the fan coverage of the core. In the event of a partial or complete stall of a slave fan, the master fan must be slowed or stopped to prevent interference of the respective fan blades.

In the offset plane embodiment, means are provided for operating the master fan independent of the slave fan(s) in the event of a hard stall of a slave fan. In the event tat one or more of the slave fans becomes partially stalled by bearing wear, for example, the remaining fans are permitted to operate at a higher than commanded speed, independent of the partially stalled fan.

BRIEF DESCRIPTION OF THE DRAWINGS

FIGS. 1 and 2 depict various cooling fan arrangements considered for the control of this invention.

DETAILED DESCRIPTION OF THE DRAWINGS

Referring now more particularly to FIGS. 1 and 2, various cooling fan arrangements considered for the control of this invention are shown. As indicated above, the trend toward the use of relatively low aspect ratio engine heat exchanger cores has resulted in the need for multiple relatively small diameter cooling fan arrangements in order to provide adequate air flow across the core. This invention meets that need by providing improved cooling fan arrangements having one master fan and one or more slave fans magnetically coupled to the master fan.

Figure 1A:
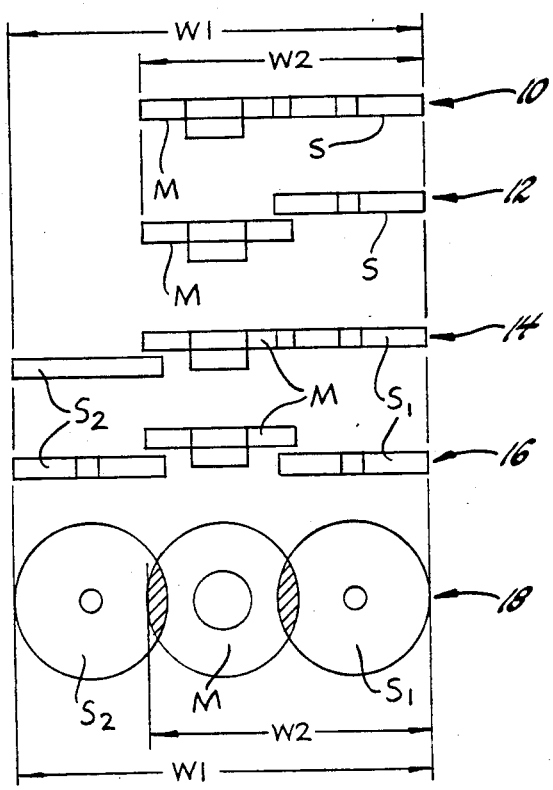
FIGS. 1a and 1b depict two and three fan embodiments in which magnetic material is molded into the fan blades.
Figure 1B:
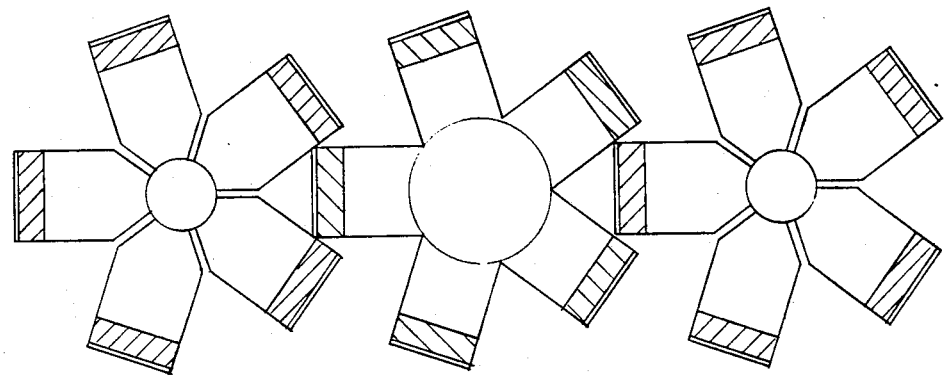

A first class of cooling fan geometries considered in mechanizing this invention are depicted in FIGS. 1a and 1b. In such class, the individual fan blades are freestanding, supported only at the respective fan hub, and magnetic material is formed or deposited in each of the fan blades, as described below in reference to FIGS. 3-4. Within this class of geometries, there are two-fan embodiments as designated generally by the reference numerals 10 and 12, and three-fan embodiments as designated generally by the reference numerals 14 and 16. In each case the master (motor driven) fan is designated by the letter M and the slave fan by the letter S. In the three-fan embodiments, the slave fans are identified as $S_1$ and $S_2$. A profile view of a three-fan embodiment is depicted in the lower portion of FIG. 1a as designated generally by the reference numeral 18.

The fans depicted in FIGS. 1a and 1b have a designated area of overlap dictated by magnetic coupling requirements as explained below. An overall width of W1 results with a three-fan embodiment and an overall width of W2 results with a two-fan embodiment. The master and slave fans may be either coplanar (as in embodiments 10 and 14) or offset (as in embodiments 12 and 16).

Figure 3:
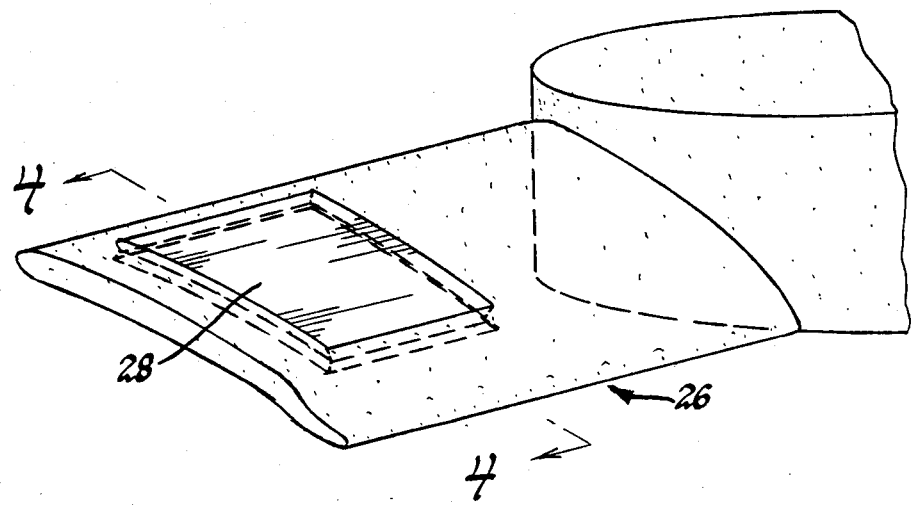
FIGS. 3 and 4 depict the placement of the magnetic material within the fan blades for the embodiments depicted in FIGS. 1a and 1b.
Figure 4:
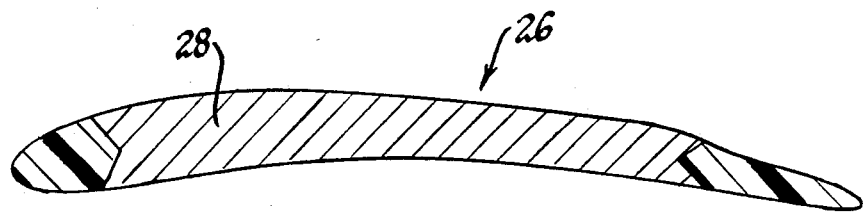

In FIG. 1b the magnetic material is indicated by the shaded area near the radial end of each fan blade for a three-fan embodiment. As indicated above the amount of overlap between fan blades is chosen to maximize the magnetic coupling between the respective blades. Further detail on the placement of the magnetic material within a respective fan blade is depicted in FIGS. 3 and 4. As indicated in reference to such Figures, the magnetic material may be injection molded into a standard nylon fan blade.

Figure 2A:
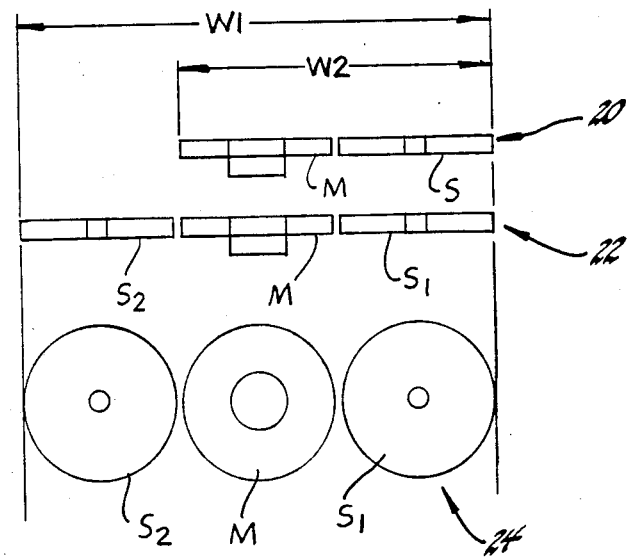
FIGS. 2a and 2b depict two and fan embodiments in which the magnetic material is molded into circumferential fan rings.
Figure 2B:
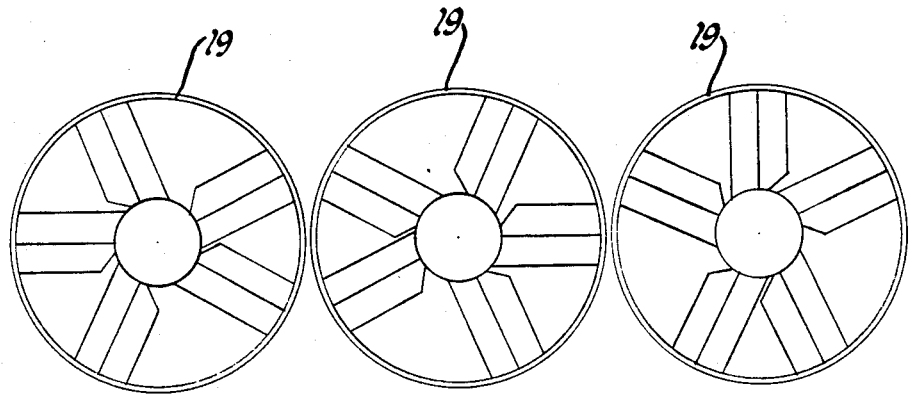

A second class of cooling fan geometries considered in mechanizing this invention are depicted in FIGS. 2a and 2b. In this class, the blades of a given fan are supported at their radial endpoints by a circumferential ring 19 which carries the magnetic material. In such case, magnetic coupling between the master and slave fans is ensured by maintaining a minimum distance between the juxtaposed circumferential rings. As with the fan embodiments depicted in FIGS. 1a and 1b, both two-fan and three-fan embodiments are considered. A two-fan embodiment is designated by the reference numeral 20 and a three-fan embodiment is designated by the reference numeral 22. A profile view of a three-fan embodiment is designated by the reference numeral 24.

FIGS. 3 and 4 depict elevational and cross-sectional views of a nylon fan blade 26 having a magnetic region 28 formed therein. The region 28 is occupied by a permanent magnet material mechanically interlocked with the nylon fan blade 26 as shown. Such material may be formed in the blades 26 using a conventional insert molding process. Various magnetic materials are available for this application and process, and the required area of the regions 28 depends on the properties of the selected magnetic material. In a mechanization of the present invention, standard ferrite magnetic material was employed, resulting in a fan blade with the approximate dimensions illustrated in FIG. 3.

Preferably, the magnetic regions 28 are located near the tips of the fan blades 26, as indicated in FIGS. 3-4 to minimize the area of fan blade overlap. Obviously, this is not a consideration for the class of fan geometries depicted in FIG. 2a-2b; there, the magnetic regions are made as large and strong as possible to permit reliable operation with easily achievable spacing of juxtaposed fan rings.

Figure 5:
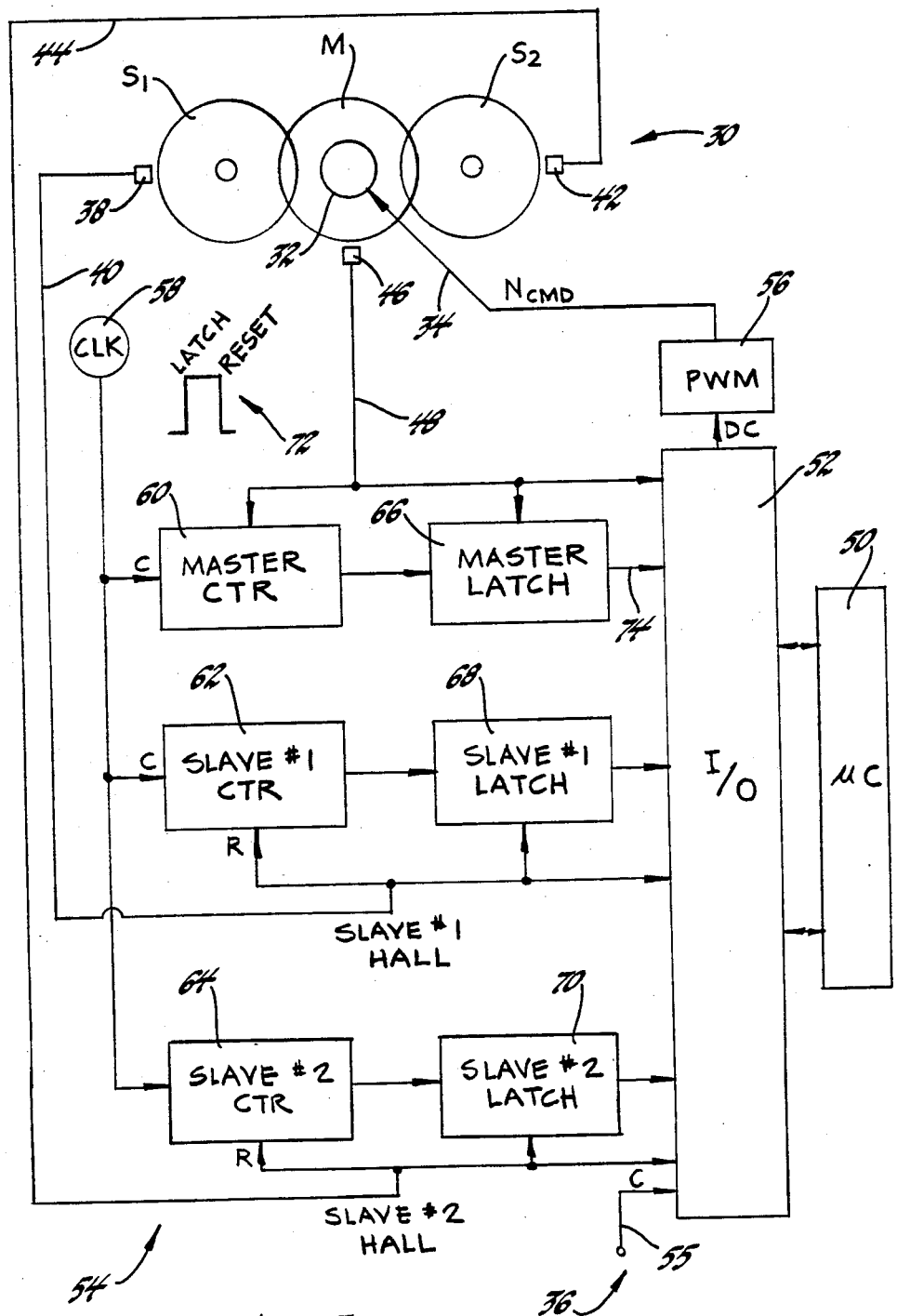
FIG. 5 depicts a block diagram of the control of this invention including a microcomputer based control unit and a brushless DC motor control unit.

Referring now to FIG. 5, the reference numeral 30 generally designates a three-fan embodiment of the class depicted in FIGS. 1a and 1b. The master fan is designated by the letter M and the slave fans are designated by the letters $S_1$ and $S_2$. A motor and motor controller 32 which may be integral with the hub of the master fan M is controlled by a speed command $N_{cmd}$ applied thereto via line 34, and the magnetic coupling between the overlapping fan blades produces synchronous rotation of the slave fans $S_1$ and $S_2$.

Figures 16A, 16B:
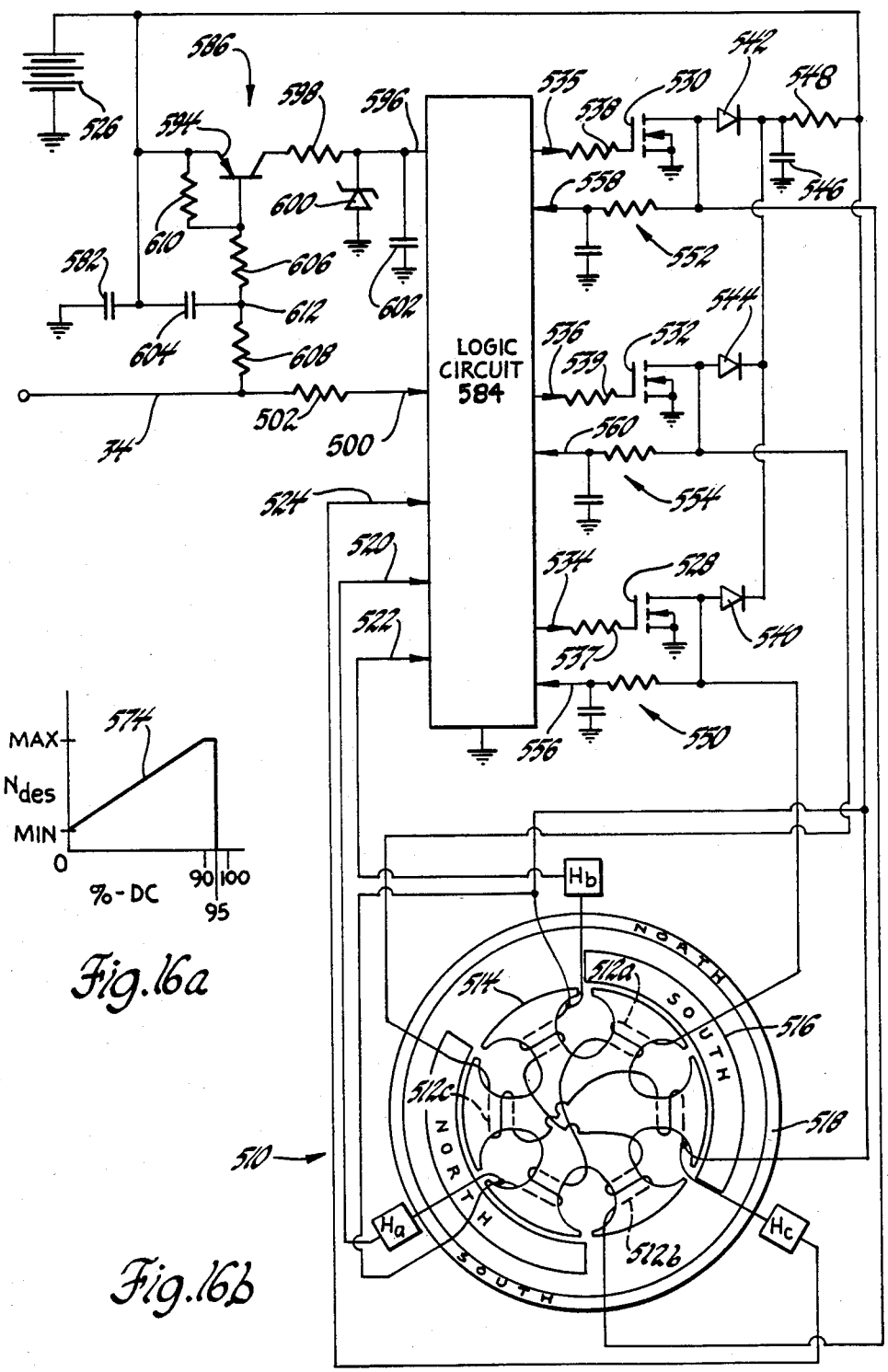
FIGS. 16a-16c depict representative circuit diagrams for the motor control unit of FIG. 5.
Figure 16C:
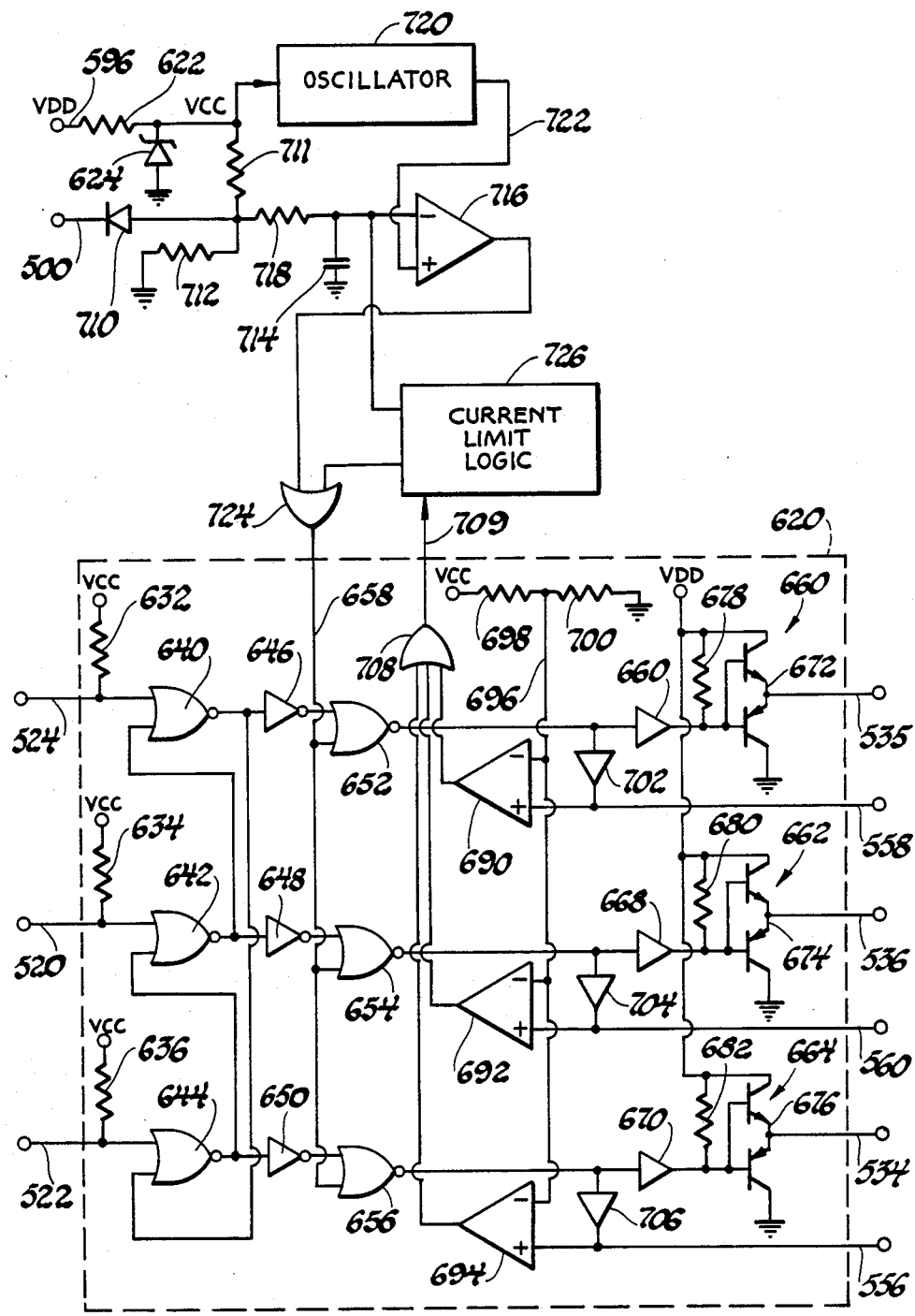

To achieve the synchronous rotation of the slave fans $S_1$ and $S_2$, a control unit designated generally by the reference numeral 36 obtains information regarding the speed of each of the cooling fans. The Hall sensor 38 is responsive to the passage of the fan blade magnetic material of slave fan $S_1$, and provides an electrical signal in accordance with the rotary speed of the slave fan $S_1$ on line 40. A Hall sensor 42 is responsive to the passage of the magnetic material in the fan blades of slave fan $S_2$ and provides an electrical signal in accordance with the rotary speed of slave fan $S_2$ on line 44. A Hall sensor 46 is responsive to the passage of the magnetic material in the fan blades of the master fan M and provides an electrical signal in accordance with the rotary speed of the master fan M on line 48. Alternately, the master fan speed information may be obtained from the motor controller 32. A representative motor controller circuit is depicted in FIGS. 16a-16c.

The control unit 36 comprises a microcomputer 50 and an input/output unit (I/O) 52. A data acquisition circuit, generally designated by the reference numeral 54, obtains speed related information from the Hall sensors 38, 42 and 46, and cooling demand information C from the input line 55, and supplies such information to the microcomputer 50 via the I/O unit 52. In turn, the microcomputer 50 determines a speed command $N_{cmd}$ for the motor controller 32 and communicates such information to the line 34 via I/O unit 52 and a conventional pulse-width-modulation (PWM) circuit 56. Flow diagrams representative of suitable computer program instructions executed by the microcomputer 50 in determining the speed command $N_{cmd}$ are described below in reference to the flow diagrams of FIGS. 6-15.

Referring now to the data acquisition circuit 54, a digital clock (CLK) 58 supplies a high frequency train of pulses to a MASTER COUNTER 60, a SLAVE #1 COUNTER 62 and a SLAVE #2 COUNTER 64. Each of the counters 60-64 accumulates a count in accordance with the clock pulses of clock 58. The count in the MASTER COUNTER 60 is supplied as an input to the MASTER LATCH 66; the count in the SLAVE #1 COUNTER 62 is supplied to the SLAVE #1 LATCH 68; and the count in the SLAVE #2 COUNTER 64 is supplied to the SLAVE #2 LATCH 70.

The operation of the MASTER COUNTER 60 and MASTER LATCH 66 are controlled by the output of master Hall sensor 46 on line 48. As each fan blade of the master fan M passes the master Hall effect device 46, a pulse is generated on line 48 as generally designated by the reference numeral 72. At the leading edge of the pulse the MASTER LATCH 66 stores (latches) the output count of the MASTER COUNTER 60 and supplies such count as an input to I/O device 52 via line 74. At the trailing edge of the pulse the count stored in MASTER COUNTER 60 is reset to zero. The master Hall sensor output on line 48 is also supplied to I/O device 52 to inform the microcomputer 50 that an updated count corresponding to the master fan speed is ready for acquisition. In like manner, the SLAVE #1 COUNTER 62 and SLAVE #1 LATCH 68 are controlled by the slave #1 Hall effect device output on line 40; and the SLAVE #2 COUNTER 64 and SLAVE #2 LATCH 70 are controlled by the slave #2 Hall device output on line 44. The Hall device outputs on lines 40 and 44 are also supplied to I/O unit 52 for indicating that the respective speed related counts are ready for acquisition.

Figure 6:
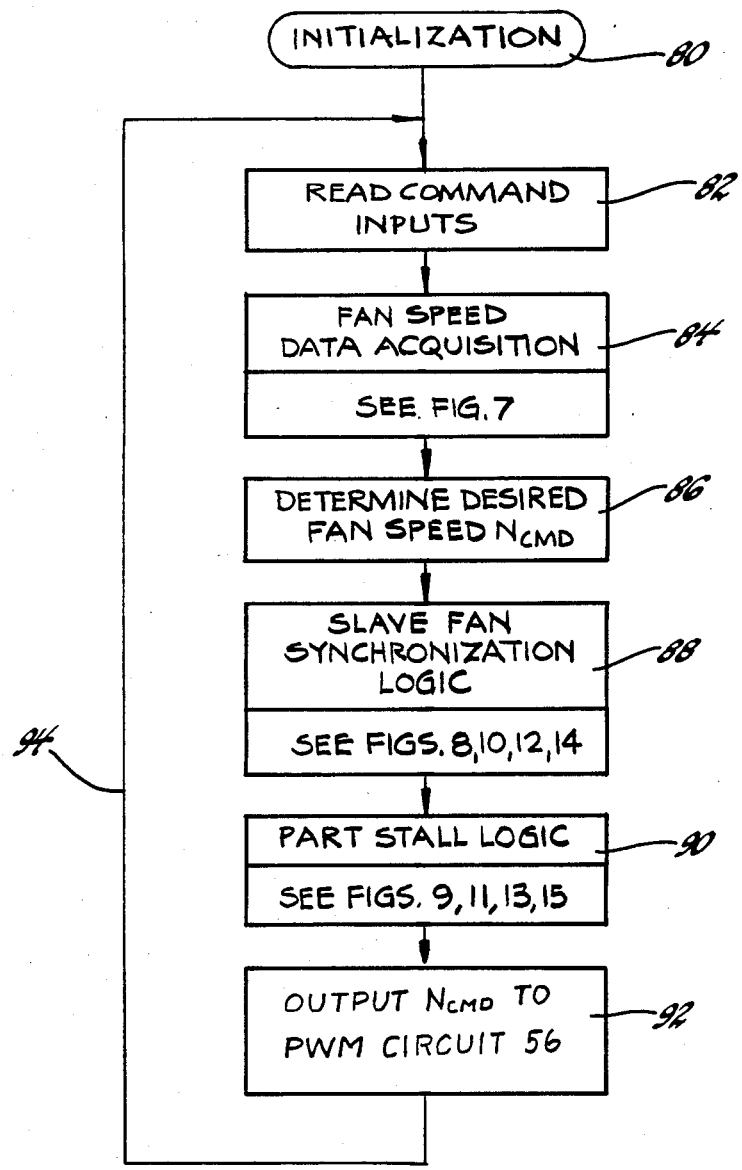
FIGS. 6, 7, 8a-8b, 9, 10a-10b, 11, 12a-12b, 13, 14a-14b and 15a-15c depict flow diagrams representative of computer program instructions executed by the microcomputer based control unit of FIG. 5 in carrying out the control functions of this invention.

The flow diagrams depicted in FIGS. 6-15 represent program instructions to be executed by the microcomputer 50 of control unit 36 in mechanizing the control of this invention. The flow diagram of FIG. 6 represents a main or executive program which calls various subroutines for executing particular control functions as necessary. The flow diagrams of FIGS. 7-15 represent the functions performed by those subroutines which are pertinent to the present invention.

Figure 7:
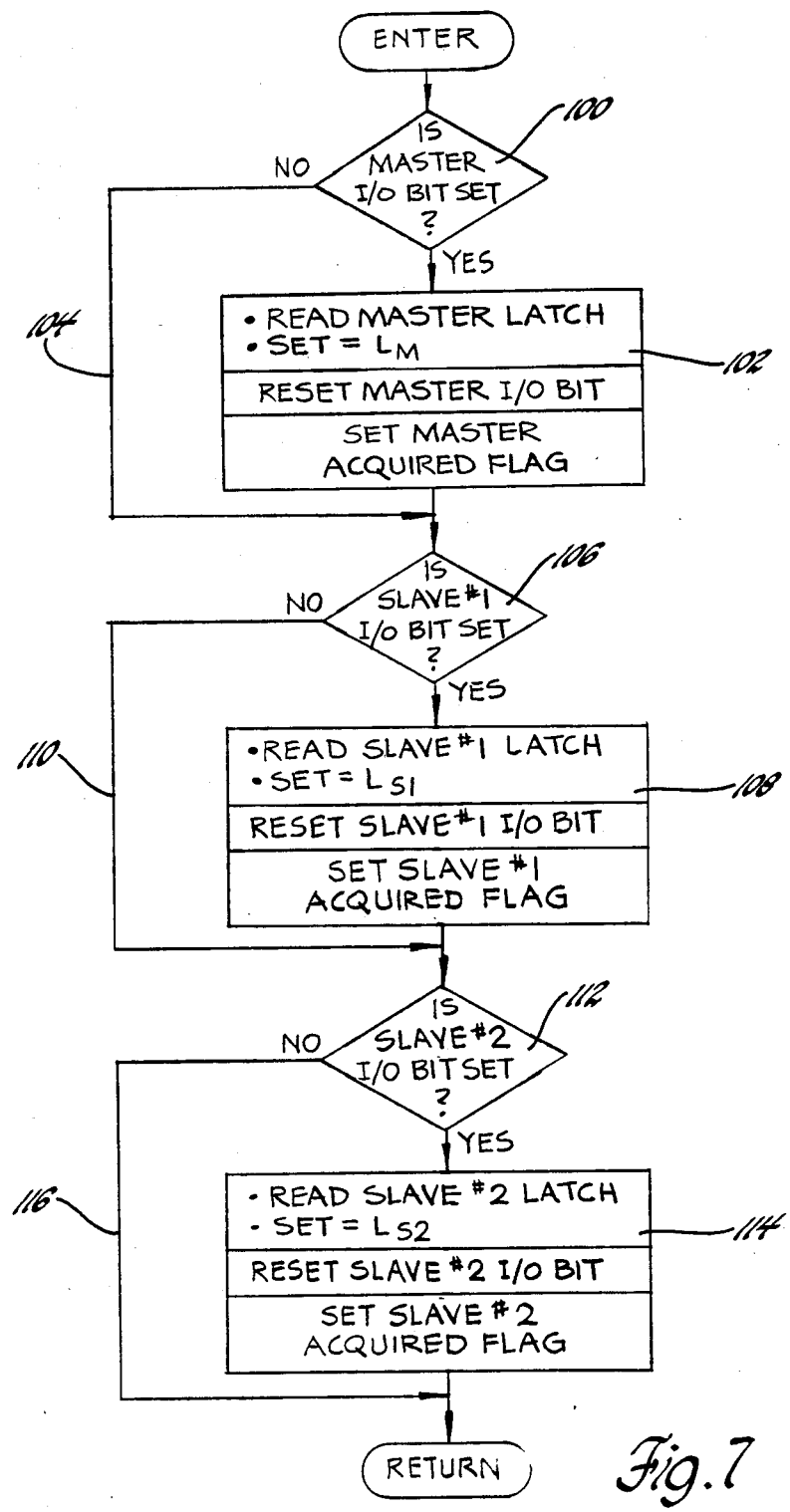

The flow diagram of FIG. 7 pertains to the acquisition of the fan speed data described above in reference to FIG. 5. The flow diagrams of FIGS. 8a–8b and 9 pertain to a two-fan embodiment in which the blades of the master and slave fans are coplanar as indicated in the embodiment 10 of FIG. 1a. The flow diagrams of FIGS. 10a–10b and 11 pertain to a two-fan embodiment in which the master and slave fan blades are not meshed as indicated in the embodiment 12 of FIG. 1a, and the embodiment 20 of FIG. 2a. The flow diagrams of FIGS. 12a–12b and 13 pertain to a three-fan embodiment in which the slave fan blades are meshed with the master fan blades, as indicated in the embodiment 14 of FIG. 1a. The flow diagrams of FIGS. 14a–14b and 15a–15c pertain to a three-fan embodiment in which the master and slave fan blades are not meshed as indicated in the embodiment 16 of FIG. 1a and the embodiment 22 of FIG. 2a.

Referring now to the main loop flow diagram of FIG. 6, the reference numeral 80 designates a set of program instructions executed at the initiation of each period of vehicle operation for initializing the various registers, timers, etc. used in carrying out the control functions of this invention. Following such initialization, the instruction blocks 82–92 are repeatedly executed in sequence as designated by the flow diagram lines connecting such blocks and the return line 94.

The instruction block 82 serves to read and condition the various input signals applied to the I/O unit 52, including the Hall device inputs on lines 40, 44 and 48 and the cooling demand signal C on line 55. Instruction block 84 controls the acquisition of the fan speed data described above in reference to FIG. 5, and is described in greater detail in the flow diagram of FIG. 7, as indicated. The instruction block 86 serves to develop a desired fan speed command $N_{cmd}$ as a function of the cooling demand input on line 55. The instruction block 88 pertains to the logic for synchronizing the master and slave fans and is described in more detail in the flow diagrams of FIGS. 8, 10, 12 and 14 for the various cooling fan embodiments as indicated. The instruction block 90 pertains to the logic used in the event of a partial stall of a slave fan and is described in more detail in the flow diagrams of FIGS. 9, 11, 13 and 15 as indicated. The instruction block 92 serves to output the speed command $N_{cmd}$ to PWM circuit 56, which in turn, supplies the motor controller 32 a corresponding PWM signal via line 34.

Referring now to the data acquisition flow diagram of FIG. 7, the decision block 100 is first executed to determine if the input bit of I/O unit 52 corresponding to the master Hall device output line 48 has been set by the generation of a pulse as designated by the reference numeral 72 in FIG. 5. If so, master fan speed data is ready for acquisition and the instruction block 102 is executed to read the contents of the MASTER LATCH 66, storing such count in the variable $L_M$, to reset the master I/O bit, and to set the MASTER ACQUIRED flag. If the master I/O bit is not set, the execution of instruction block 102 is skipped as indicated by the flow diagram line 104. Then the decision block 106 is executed to determine if the input bit of the I/O unit 52 corresponding to the slave #1 Hall device output line 40 is set. If so, the SLAVE #1 LATCH 68 has been updated with new speed information pertaining to the slave #1 fan and the instruction block 108 is executed to read the contents of the SLAVE #1 LATCH, storing the count in the variable $L_{S1}$, to reset the slave #1 I/O bit, and to set the SLAVE #1 ACQUIRED flag. If the slave #1 I/O bit is not set, the execution of instruction block 108 is skipped as indicated by the flow diagram line 110.

In three-fan embodiments, such as designated by the reference numerals 14 and 16 in FIG. 1a and by the reference numeral 22 in FIG. 2a, the decision block 112 is then executed to determine if the input bit of I/O unit 52 corresponding to the slave #2 Hall device line 44 is set. If so the SLAVE #2 LATCH 70 has been updated with new data pertaining to the speed of the slave #2 fan, and the instruction block 114 is executed to read the contents of the SLAVE #2 LATCH 70, storing the count in the variable $L_{S2}$, to reset the slave #2 I/O bit, and to set the SLAVE #2 ACQUIRED flag. If the slave #2 I/O bit is not set, the execution of instruction block 114 is skipped as indicated by the flow diagram line 116.

Figure 8A:
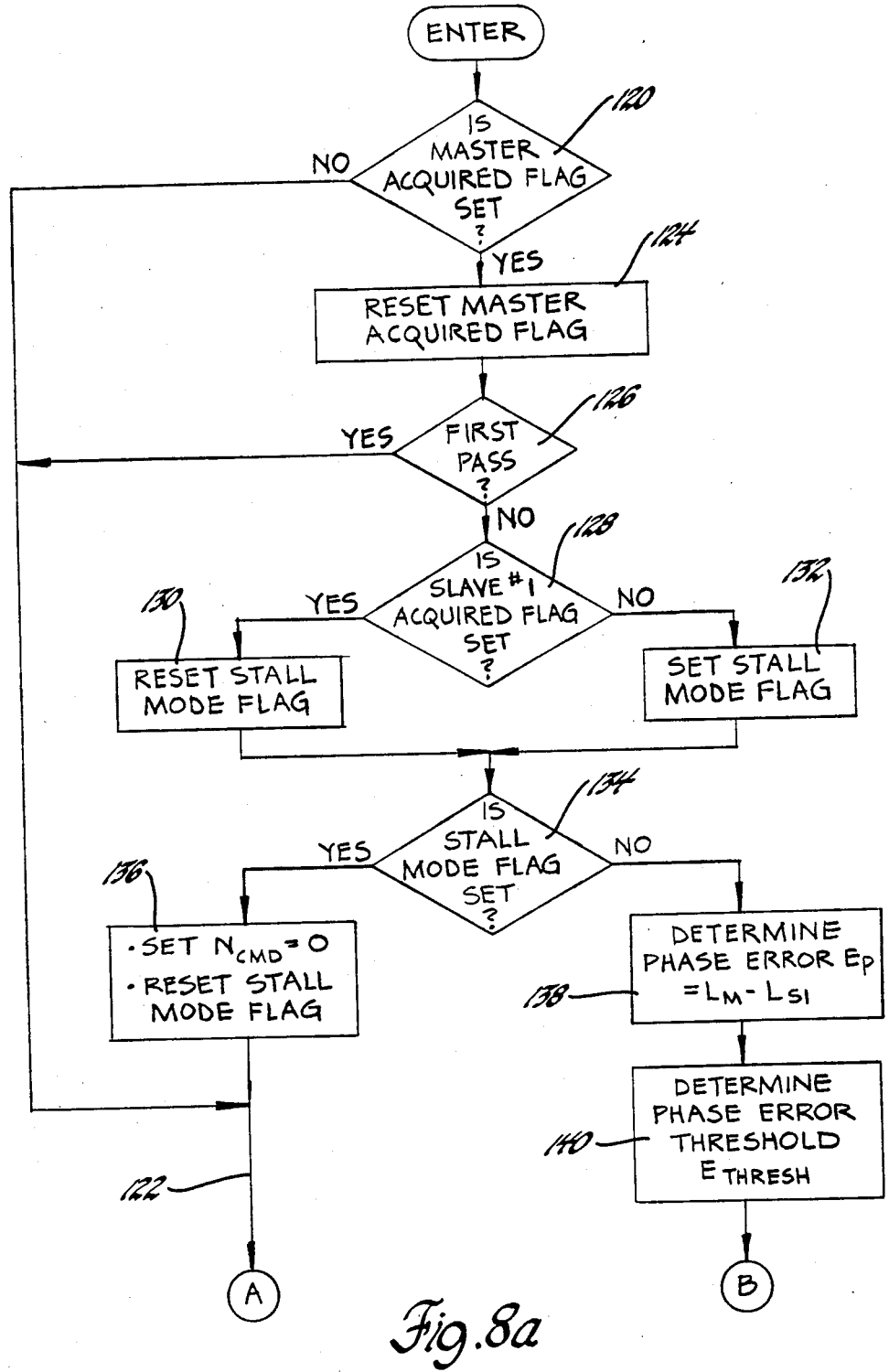
Figure 8B:
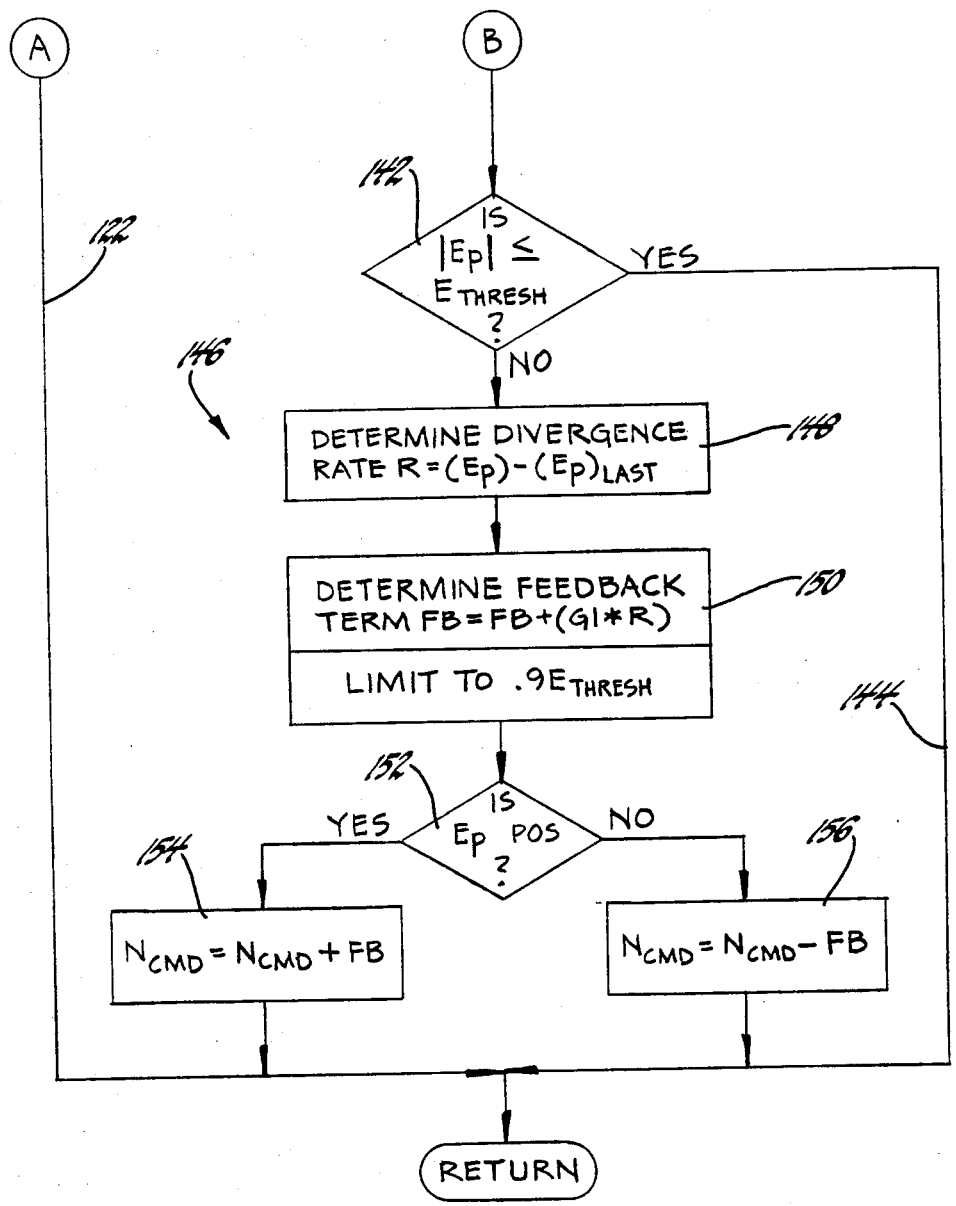
Figure 9:
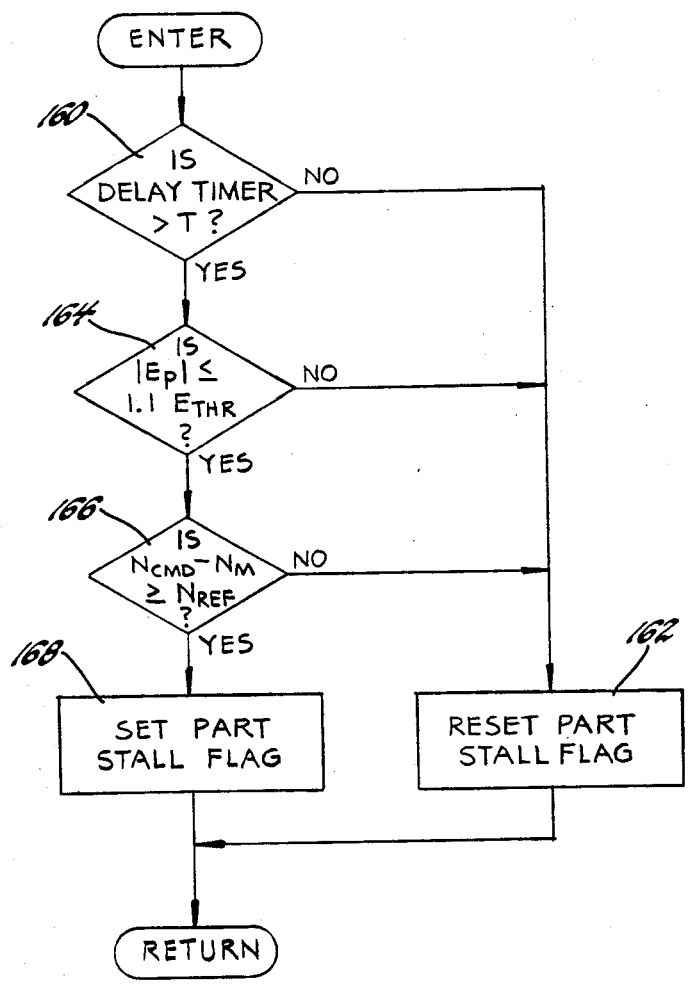

As indicated above, the flow diagrams of FIGS. 8a–8b and 9 pertain to a two-fan installation such as depicted by the reference numeral 10 in FIG. 1a in which the master and slave fan blades are enmeshed and coplanar. The flow diagram of FIG. 8 pertains to the slave fan synchronization logic and the diagram of FIG. 9 pertains to the part stall logic.

Referring particularly to the flow diagram of FIGS. 8a–8b, the decision block 120 is first executed to determine if the MASTER ACQUIRED flag is set. If not, the remainder of the routine is skipped as indicated by the flow diagram line 122 and the circled letter A. If so, speed data for the master fan M has been acquired and the instruction block 124 is executed to reset the MASTER ACQUIRED flag. Thereafter, the decision block 126 is executed to determine if the present execution of the slave flag synchronization logic is the first such execution since turn-on of the master fan. If so, the remainder of the routine is skipped as indicated by the flow diagram line 122 and the circled letter A. In subsequent execution of the slave fan synchronization logic, the decision block 126 will be answered in the negative and the decision block 128 will be executed to determine if the SLAVE #1 ACQUIRED flag is set. If so, the slave #1 fan is rotating and the instruction block 130 is executed to reset the STALL MODE flag. If the decision block 128 is answered in the negative, the slave #1 fan has not moved and the instruction block 132 is executed to set the STALL MODE flag. Once the STALL MODE flag is set, as determined at decision block 134, the instruction block 136 is executed to set the speed command $N_{cmd}$ to zero and to reset the STALL MODE flag, completing the routine.

If the STALL MODE flag is not set, the instruction blocks 138 and 140 are executed to determine the actual phase error $E_P$ between the master and slave fans and to determine a threshold $E_{THR}$ corresponding to the amount of allowable phase error. As indicated at instruction block 138, the phase error $E_P$ is determined in relation to the difference between the counts read from the MASTER LATCH 66 and the SLAVE #1 LATCH 68. If the absolute value of the phase error $E_P$ is less than or equal to the phase error threshold $E_{THR}$, as determined at decision block 142 of FIG. 8b, the remainder of the routine is skipped as indicated by the flow diagram line 144. If the absolute value of the phase error $E_P$ is greater than the threshold $E_{THR}$, the flow diagram portion designated by the reference numeral 146 is executed to effect a modification of the speed command $N_{cmd}$ for correcting the phase error.

Referring to the flow diagram portion 146, the instruction block 148 is first executed for determining the rate of phase error divergence R according to the difference between the present phase error $E_P$ and the previously computed phase error $(E_P)_{LAST}$. The instruction block 150 is then executed to determine a feedback or correction term FB according to the expression $$FB = FB + (G1*R),$$

where G1 is a gain factor. The feedback term FB is limited to 90% of the threshold phase error $E_{THR}$ as indicated. If the phase error $E_P$ is positive, as determined at the decision block 152, the slave #1 fan is leading the master fan and the instruction block 154 is executed to increase the speed command $N_{cmd}$ by the feedback term FB. If the phase error $E_P$ is negative, the master fan is leading the slave fan and the instruction block 156 is executed to reduce the speed command $N_{cmd}$ by the feedback term FB.

The part stall logic of FIG. 9 serves to establish a delay period following the initiation of motor operation and to compare the actual speed of the master fan with the commanded fan speed $N_{cmd}$ at the termination of such delay period to determine if a part stall condition has occurred. As indicated above, part stall conditions can occur for a number of reasons, including a bearing failure or a partial mechanical interference, and result in a condition in which the motor controller 32 is unable to drive the fans at the commanded speed $N_{cmd}$.

Initially, the decision block 160 is executed to determine if the count in a DELAY TIMER is greater than a reference time T. If not, the instruction block 162 is executed to set the PART STALL flag, completing the routine. If so, the delay period has elapsed and the decision block 164 is executed to determine if the phase error $E_P$ is within 10% of the phase error threshold $E_{THR}$. If so, the decision block 166 is executed to determine if the difference between the commanded speed $N_{cmd}$ and the master fan speed $N_M$ is greater than or equal to a reference speed $N_{REF}$. If so, there is a partial stall of either the master or slave fan. In such event, the instruction block 168 is executed to set the PART STALL flag for alerting the operator of the motor vehicle of the reduced cooling capacity so that system repair may be effected without delay. Continued operation of the cooling fans is permitted subject to the motor current limiting of motor controller 32.

Figure 10A:
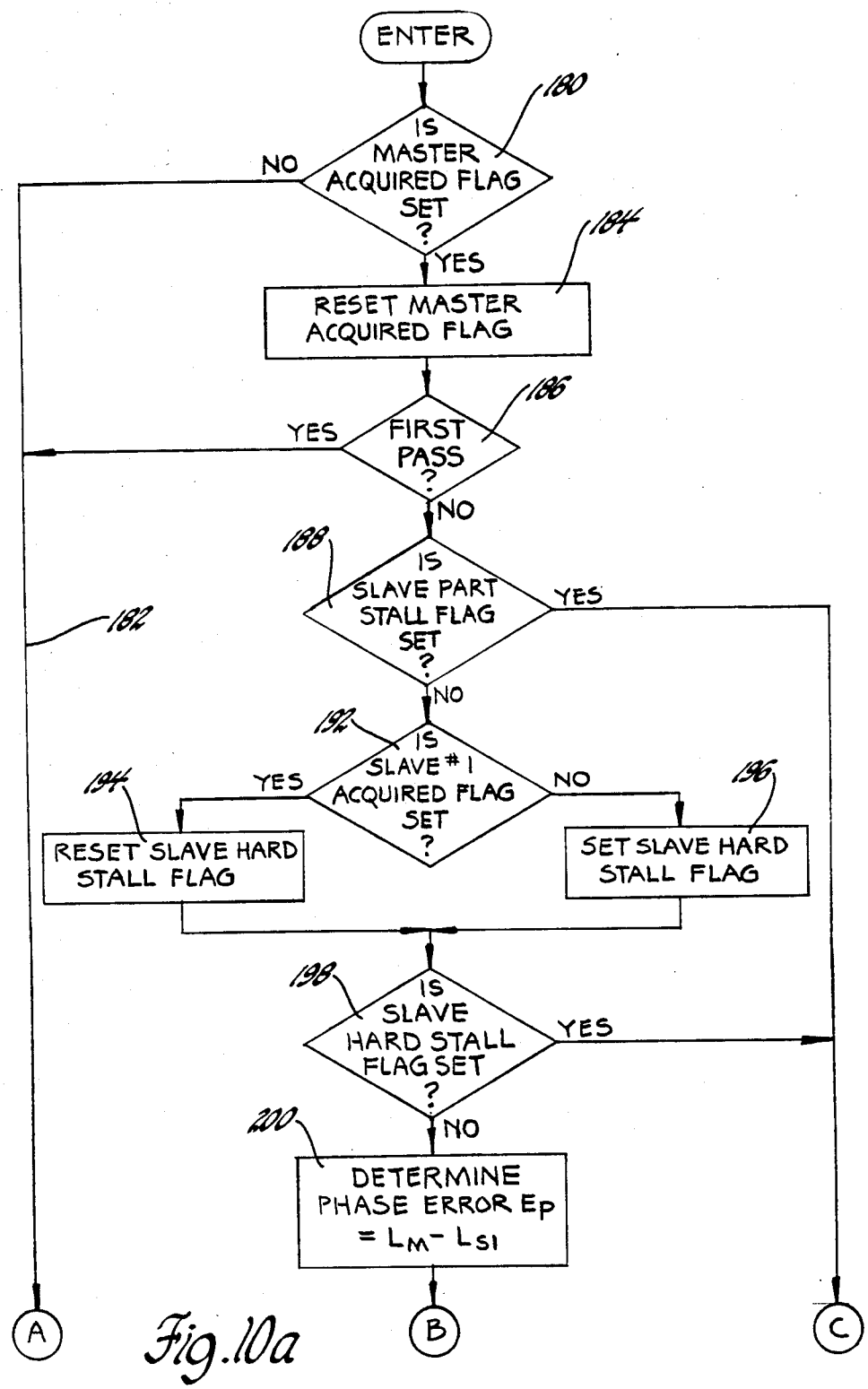
Figure 10B:
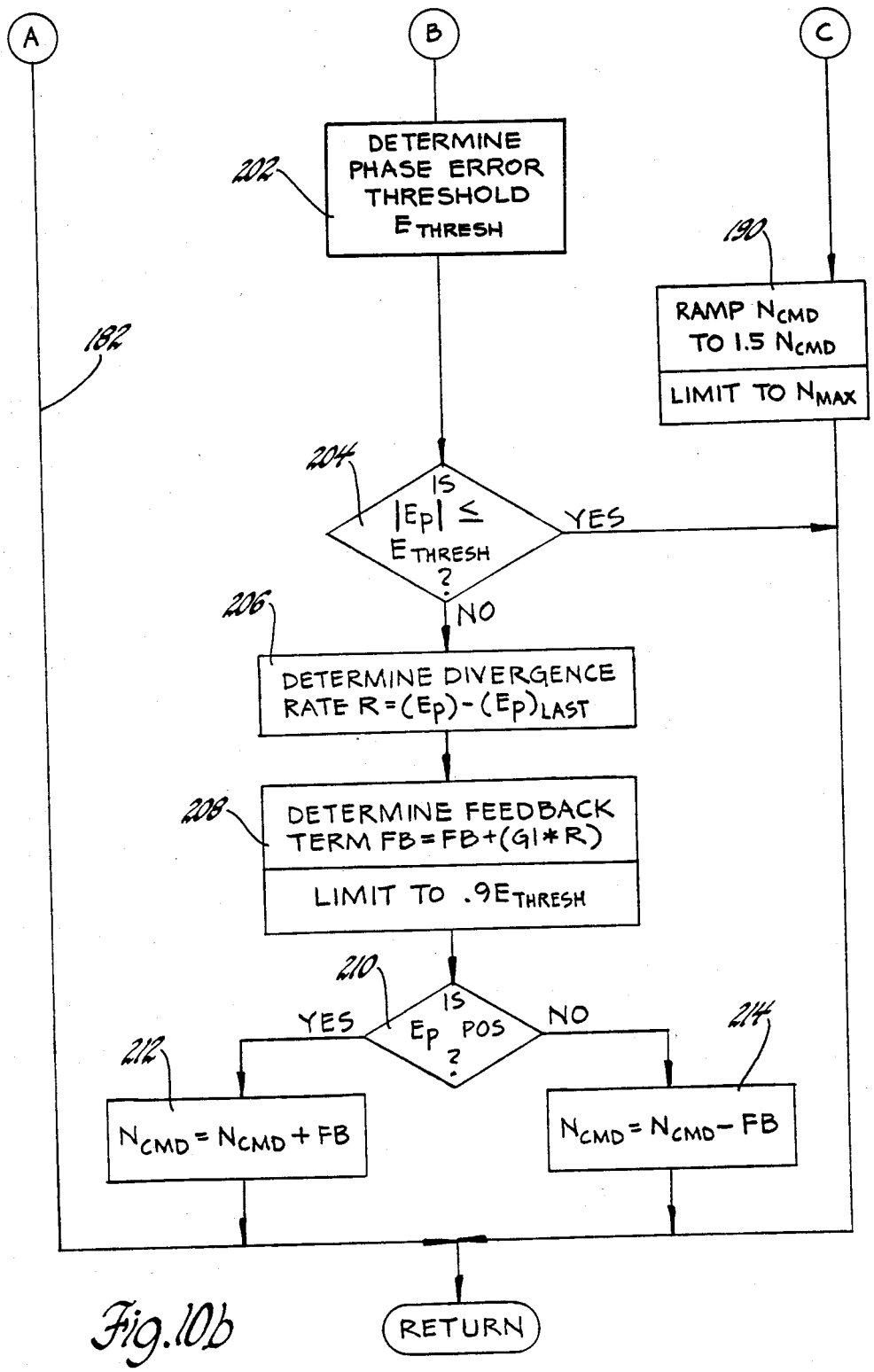
Figure 11:
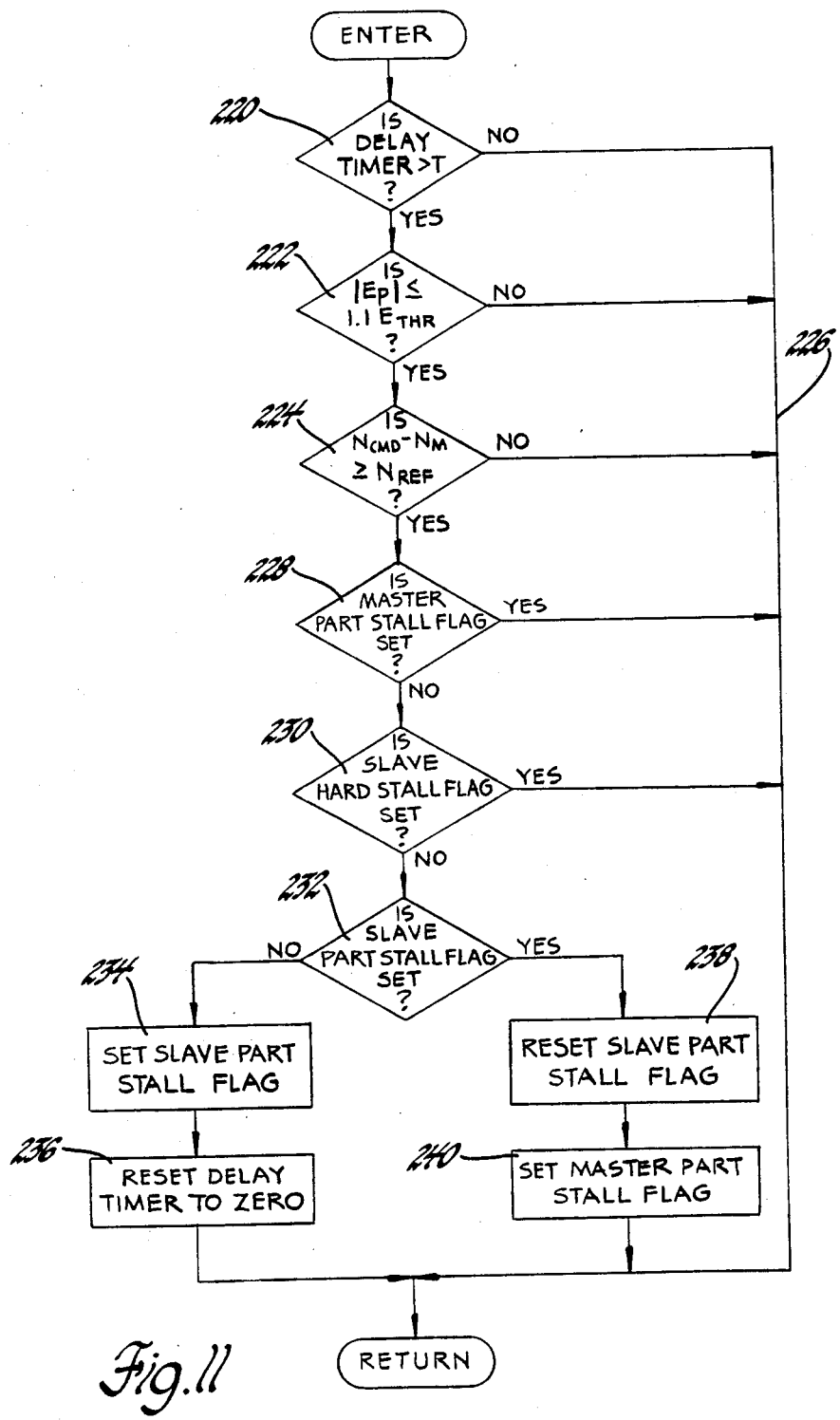

As indicated above, the flow diagrams of FIGS. 10a–10b and 11 pertain to a two-fan embodiment, as designated by the reference numeral 12 in FIG. 1a or the reference numeral 20 in FIG. 2a, in which the master and slave fan blades are not intermeshed.

Referring to the slave synchronization logic of FIGS. 10a–10b, the blocks 180, 184 and 186 are first executed substantially as described above in reference to the slave synchronization logic of FIGS. 8a–8b to determine if the data pertaining to the speed of the master fan has been acquired and if the present execution of the routine is the first such execution since initiation of motor operation. If the speed data is not acquired or if the present execution is the first execution since initiation of motor operation, the remainder of the routine is skipped as indicated by the flow diagram line 182 and he circled letter A.

The decision block 188 is then executed to determine if the SLAVE PART STALL flag is set. The routine which detects the existence of a part stall condition and controls the status of the SLAVE PART STALL flag is described below in reference to the flow diagram of FIG. 11. If the decision block 188 is answered in the affirmative, there is a part stall condition of the slave #1 fan and the instruction block 190 of FIG. 10b is executed to progressively increase (ramp) the commanded motor speed $N_{cmd}$ by 50%, limited by a maximum commanded speed limit $N_{MAX}$, completing the routine. If the SLAVE PART STALL flag is not set, the blocks 192–196 are executed to set a HARD STALL flag indicating the presence of a hard stall condition if the slave fan fails to rotate. In the event of such a hard stall condition, as determined at decision block 198, the instruction block 190 is executed as described above to progressively increase the commanded motor speed $N_{cmd}$ by 50%, limiting its value to $N_{MAX}$.

If neither part nor hard stall conditions are indicated, the instruction blocks 200–214 are executed substantially as described above in reference to FIGS. 8a–8b to compute the phase error $E_P$ between the master and slave fans, and to adjust the commanded speed $N_{cmd}$ in relation to the phase error divergence rate R if the absolute value of the phase error $E_P$ exceeds a phase error threshold $E_{THR}$.

Referring now to the part-stall logic of FIG. 11, the decision blocks 220–226 are executed substantially as described above in reference to FIG. 9 for establishing a delay period T and thereafter indicating the presence of a partial stall if the phase error $E_P$ is relatively small and the difference between the commanded motor speed $N_{cmd}$ and the actual master speed $N_M$ is relatively great. Thereafter the decision blocks 228 and 230 are executed to determine if the MASTER PART STALL flag or the SLAVE PART STALL flag is set. If either condition is true, the remainder of the routine is skipped as indicated by the flow diagram line 226. If neither flag is set, the decision block 232 is executed to determine if the SLAVE PART STALL flag is set. If not, the instruction blocks 234 and 236 are executed to set the SLAVE PART STALL flag and to reset the DELAY TIMER to zero. In such event, the slave synchronization logic will progressively increase the commanded speed $N_{cmd}$ by 50% and discontinue further attempts to synchronize the master and slave fan speeds.

If the difference between the master fan speed $N_M$ and the commanded speed $N_{cmd}$ is still in excess of the reference $N_{REF}$ at the termination of the DELAY TIMER period, the decision block 232 will be answered in the affirmative. This indicates that the slave fan is not the cause of the partial stall and the instruction blocks 238 and 240 are executed to reset the SLAVE PART STALL flag and to set the MASTER PART STALL flag. In further execution of the part stall logic, the decision block 228 will be answered in the affirmative and the fans will continue to operate at a reduced speed, limited only by the motor current limiting of motor controller 32. The setting of the MASTER PART STALL flag in such instance serves to warn the operator of the vehicle of the reduced cooling capacity so that system repair may be effected without delay.

Figure 12A:
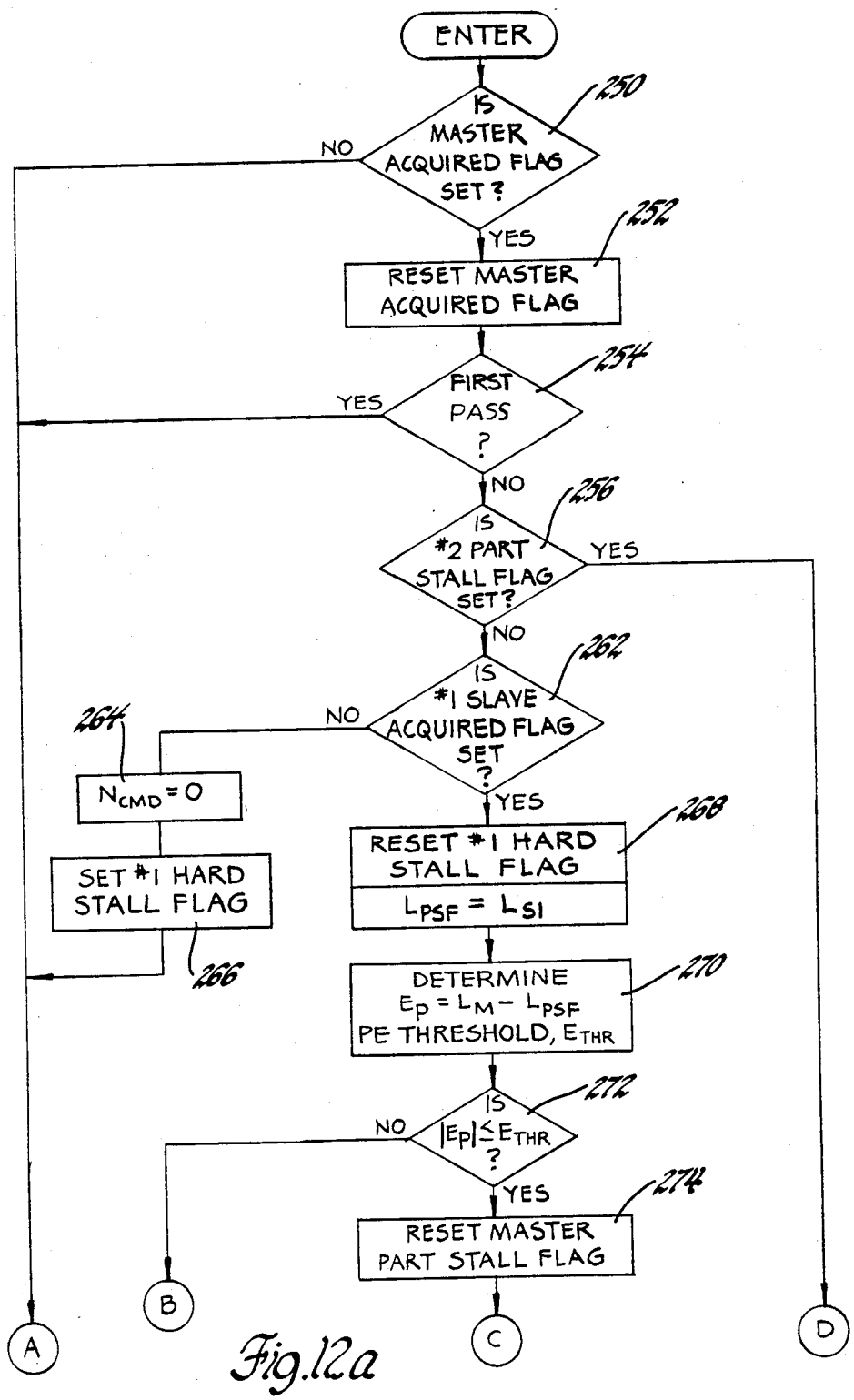
Figure 12B:
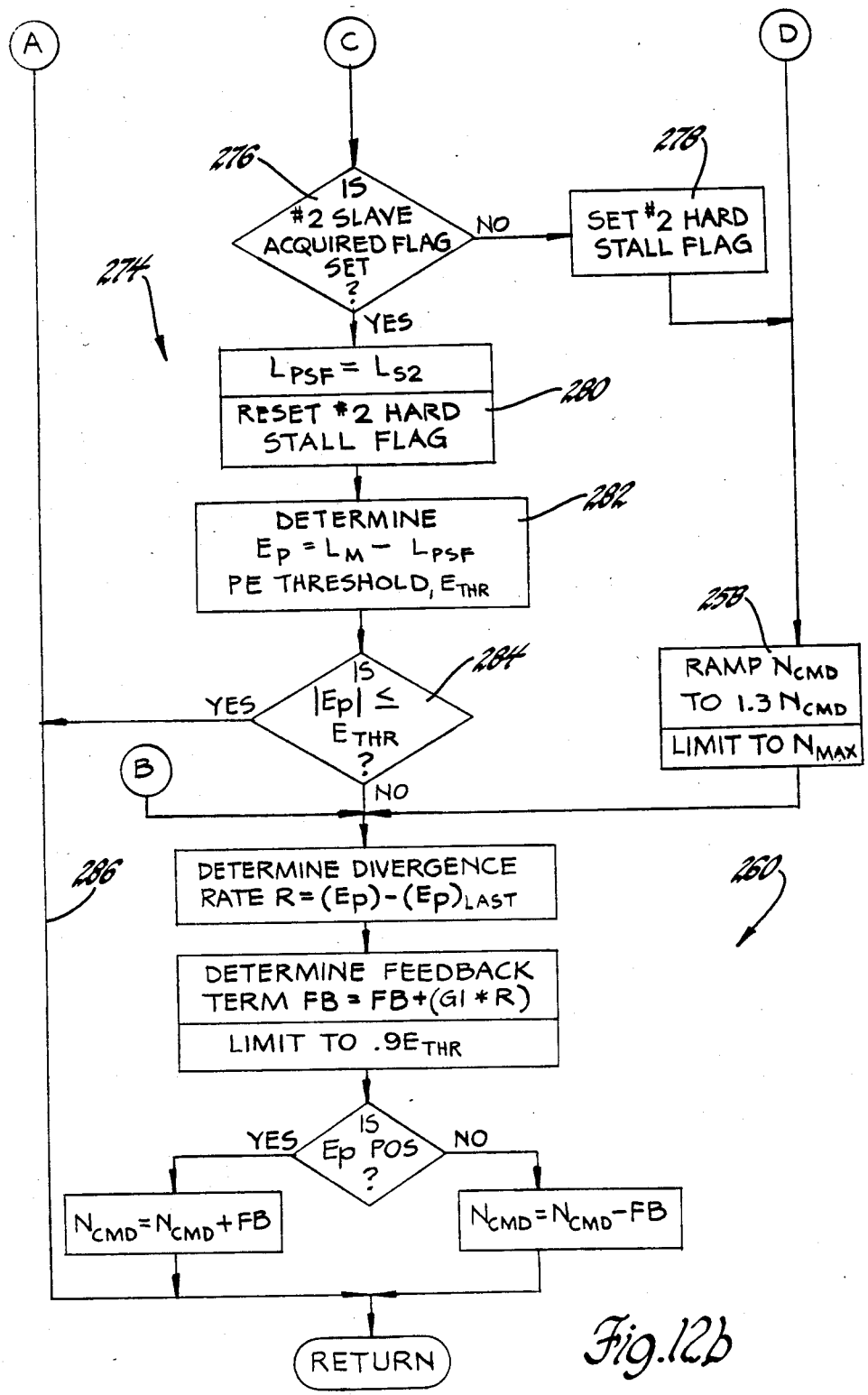
Figure 13:
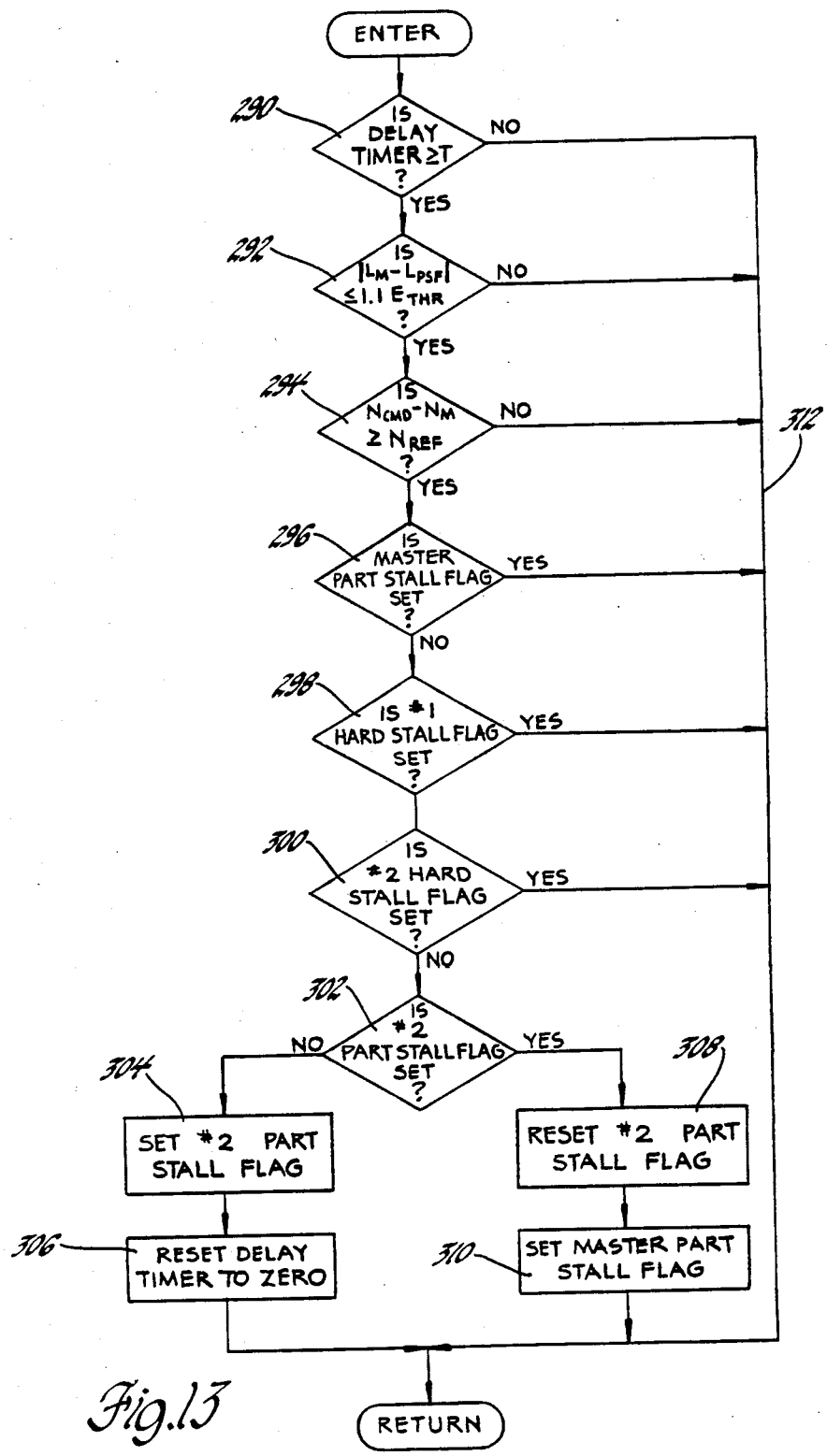

As indicated above, the flow diagrams of FIGS. 12a–12b and 13 pertain to a three-fan embodiment, as indicated by the reference numeral 14 in FIG. 1a, in which the blades of the master fan and the slave #1 fan S1 are coplanar and intermeshed.

Referring to the slave fan synchronization logic of FIGS. 12a–12b, the blocks 250–254 are first executed, as described above in reference to the flow diagram of FIGS. 8a and 10a, to indicate acquisition of the master fan speed data and to skip the execution of the remainder of the routine when the routine is first executed at the initiation of motor operation. Thereafter the decision block 256 is executed to determine if the SLAVE #2 PART STALL flag is set. If so, the instruction block 258 of FIG. 12b is executed to progressively increase (ramp) the commanded speed $N_{cmd}$ by approximately 30%, limited by $N_{MAX}$. The flow diagram portion designated generally by the reference numeral 260 is then executed to adjust the commanded speed $N_{cmd}$ as required to synchronize the master and slave #1 fans.

If the SLAVE #2 PART STALL flag is not set, the decision block 262 is executed to determine if the SLAVE #1 ACQUIRED flag is set. If not, there is a hard stall of the #1 slave fan. In such case the instruction blocks 264 and 266 are executed to set the motor speed command $N_{cmd}$ to zero and to set the SLAVE #1 HARD STALL flag. Resetting of the commanded motor speed $N_{cmd}$ to zero is necessary in such case due to the intermeshing of the master and slave #1 fan blades.

If the SLAVE #1 ACQUIRED flag is set, the instruction block 268 is executed to reset the SLAVE #1 HARD STALL flag and to set the primary slave fan term $L_{PSF}$ equal to the slave #1 count $L_{S1}$. The instruction block 270 is then executed to determine the phase error $E_P$ between the master fan and the slave #1 fan (designated as the primary slave fan) and the phase error threshold $E_{THR}$. If the absolute value of the phase error $E_P$ is greater than the phase error threshold $E_{THR}$, as determined at decision block 272, the slave #1 fan is not yet in synchronism with the master fan, and the flow diagram portion designated generally by the reference numeral 260 is executed as indicated by the circled letter B to adjust the motor speed command $N_{cmd}$ as required to effect such synchronism.

If the absolute value of the phase error $E_P$ is less than or equal to the phase error threshold $E_{THR}$, the master and #1 slave fans are rotating in substantial synchronism, and the blocks 274–284 are executed to designate the slave #2 fan as the primary slave fan and attempt to bring it into synchronism with the master and slave #1 fans. The instruction block 275 is first executed to reset the MASTER PART STALL flag. The decision block 276 then determines if the SLAVE #2 ACQUIRED flag is set. If not, the instruction block 278 is executed to set the SLAVE #2 HARD STALL flag and the instruction block 258 is executed to progressively increase the commanded motor speed $N_{cmd}$ by 30%. In such case, the slave #2 fan cannot be designated as a primary slave fan and the flow diagram portion designated generally by reference numeral 260 is executed to maintain synchronism between the master and slave #1 fan.

If the SLAVE #2 ACQUIRED flag is set, the slave #2 fan is rotating and the instruction block 280 is executed to designate the slave #2 fan as the primary slave fan and to reset the SLAVE #2 HARD STALL flag. Thereafter the instruction block 282 is executed to determine the phase error $E_P$ between the master and the slave #2 fans and a phase error threshold $E_{THR}$. If the absolute value of such phase error $E_P$ is greater than the phase error threshold $E_{THR}$, as determined at decision block 284, the flow diagram portion 260 is executed as described above to adjust the commanded motor speed $N_{cmd}$ as required to bring the master and slave #2 fans into synchronism. Once the absolute value of the phase error $E_P$ is less than or equal to the phase error threshold $E_{THR}$, the execution of the flow diagram portion 260 is skipped as indicated by the flow diagram line 286.

As indicated, the above-described flow diagram serves to effect adjustment of the commanded motor speed $N_{cmd}$ to bring the slave #1 fan into synchronism with the master fan. This is the first order of business since the blades of the master and slave #1 fans are coplanar and intermeshed. Once the slave #1 fan is brought into synchronism with the master fan, the slave #2 fan is designated as a primary slave fan and the commanded motort speed $N_{cmd}$ is adjusted to bring the slave #2 fan into synchronism with the master and slave #1 fans. If the slave #1 fan falls out of synchronism with the master during such attempt, the decision block 272 will be answered in the negative and the slave #1 fan will be re-designated as the primary slave fan. Thus the control unit 36 gives priority to the slave #1 fan but attempts when possible to bring both slave fans into synchronism with the master fan.

Referring now to the part stall logic of FIG. 13, the decision blocks 290, 292 and 294 are executed substantially as described above in reference to FIG. 9 to establish a delay period upon initial energization of the master fan motor and thereafter to determine if the master and primary slave fans are rotating in substantial synchronization (block 292) and if the master fan speed $N_M$ is within $N_{REF}$ of the commanded motor speed $N_{cmd}$ (block 294). If the blocks 290–294 are all answered in the affirmative, a part stall condition is in effect, causing the fans to rotate at a slower than desired speed. In such event, the decision blocks 296, 298 and 300 are executed to determine if the MASTER PART STALL flag is set, if the SLAVE #1 HARD STALL flag is set or if the SLAVE #2 HARD STALL flag is set. If none of the flags are set, the decision block 302 is executed to determine if the SLAVE #2 PART STALL flag is set. If not, it is first assumed that the slave #2 fan is causing the part stall condition. In such case, the instruction blocks 304 and 306 are executed to set the SLAVE #2 PART STALL flag and to reset the DELAY TIMER to zero. If on termination of the delay period the part stall condition is still in effect—i.e., blocks 290–294 answered in the affirmative—the decision block 302 will be executed and answered in the affirmative, indicating that the #2 slave fan is not the cause of the stalled condition. In such case, the instruction blocks 308 and 310 are executed to reset the SLAVE #2 HARD STALL flag and to set the MASTER PART STALL flag. Thereafter the decision block 296 will be answered in the affirmative and the remainder of the routine will be skipped as indicated by the flow diagram line 312.

The above-described flow diagram thus logically deduces the cause of the part stall condition. Initially, it is assumed that the offset or nonmeshed #2 slave fan is the cause of the stall. This assumption is tested by setting the SLAVE #2 PART STALL flag (block 304) thereby permitting the slave fan synchronization logic of FIG. 12 to bring the master and slave #1 fans up to the commanded motor speed and $N_{cmd}$. If the master and slave #1 fans can be successfully brought into synchronism to within $N_{REF}$ of the commanded motor speed, the assumption was correct and the master and slave #1 fans are caused to rotate at a speed which is approximately 30% greater than the normally commanded motor speed (block 258). If on the other hand, the part stall condition is still in effect, the ssumption has been proven faulty and the MASTER PART STALL flag is set (block 310). In such event the fans are permitted to continue running, limited only by the motor current limiting of motor controller 32. If the part stall condition is alleviated at a later point, and synchronism between the master and slave #1 fans is achieved, the MASTER PART STALL flag is reset (block 274).

Figure 14A:
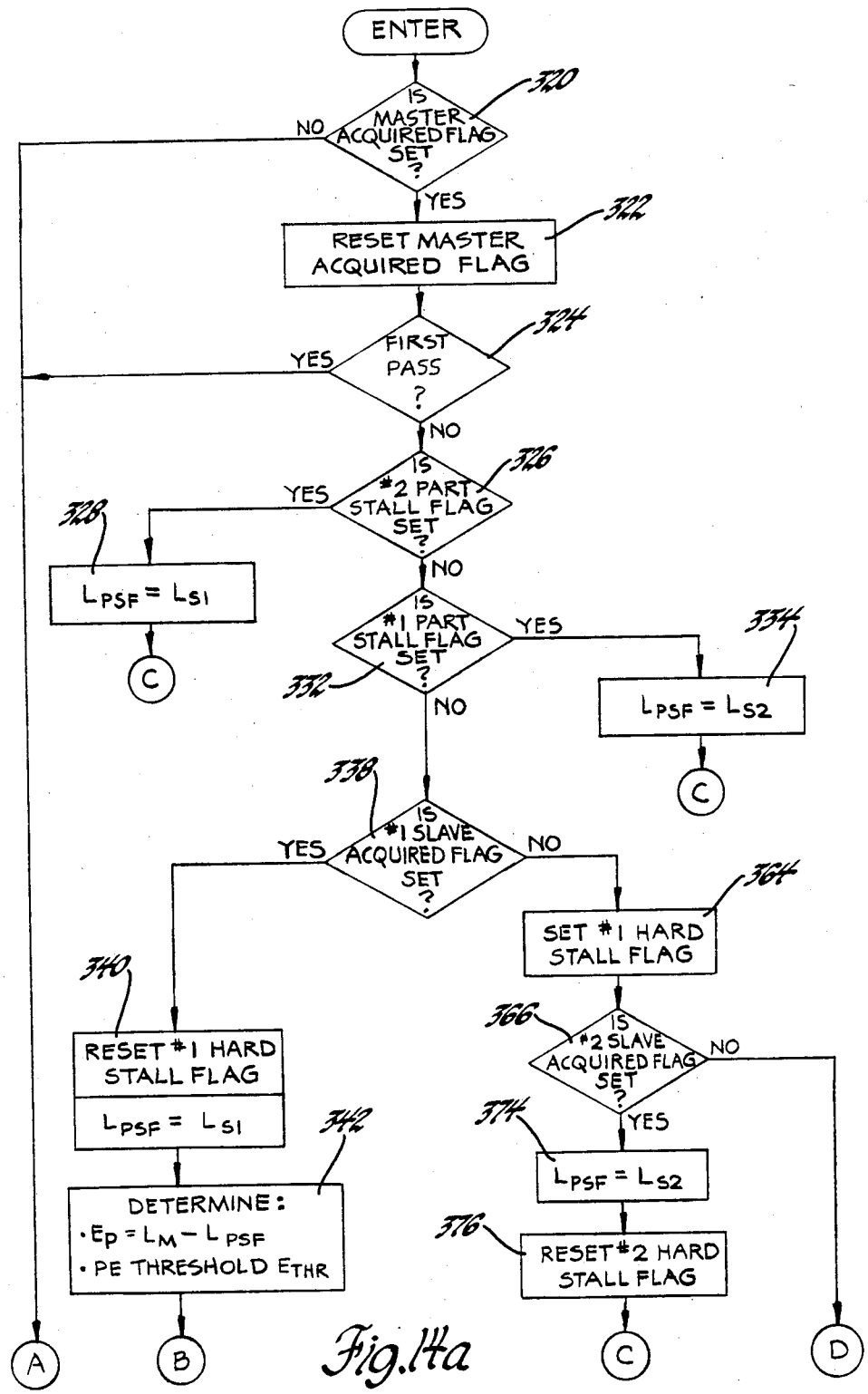
Figure 14B:
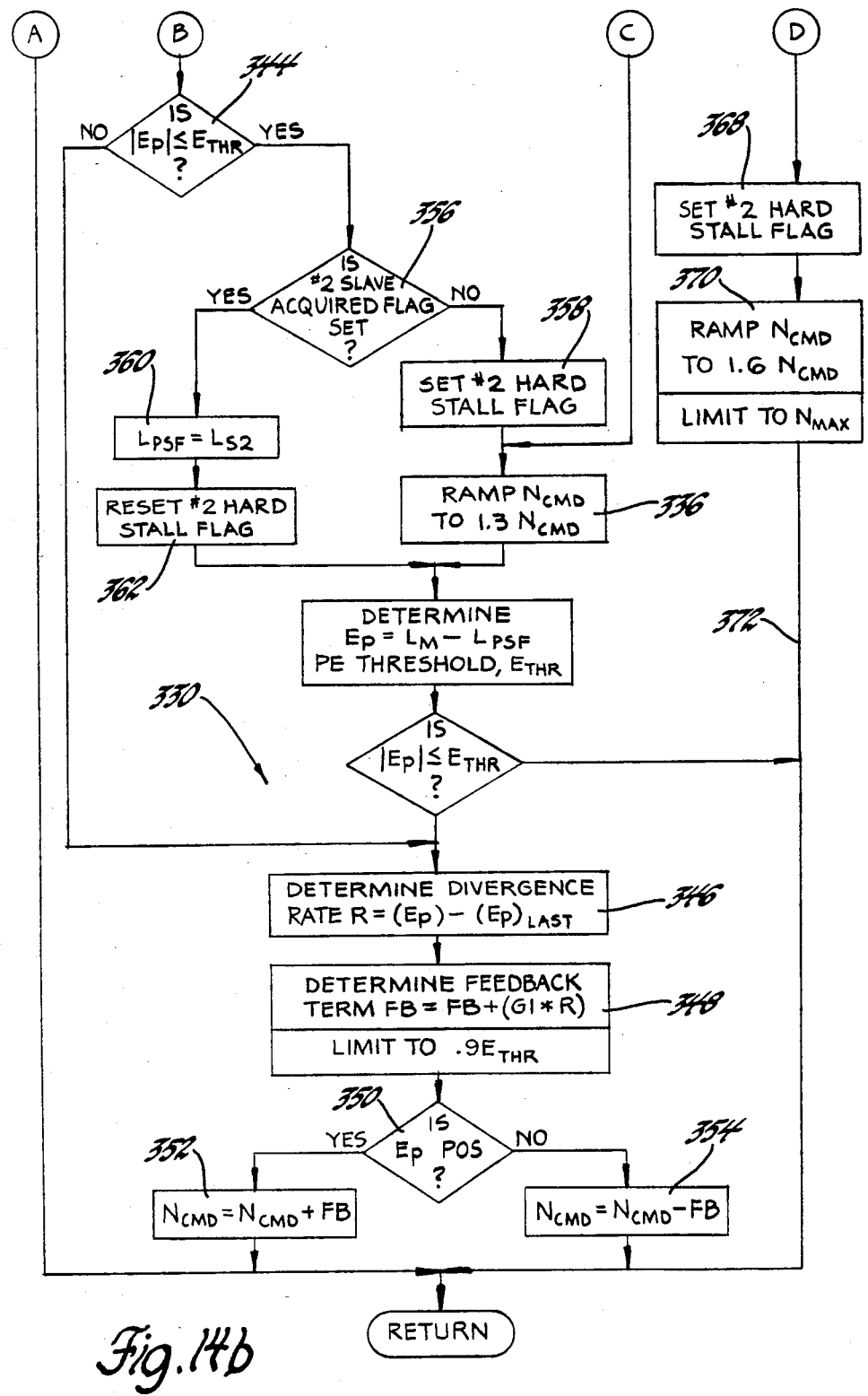
Figure 15A:
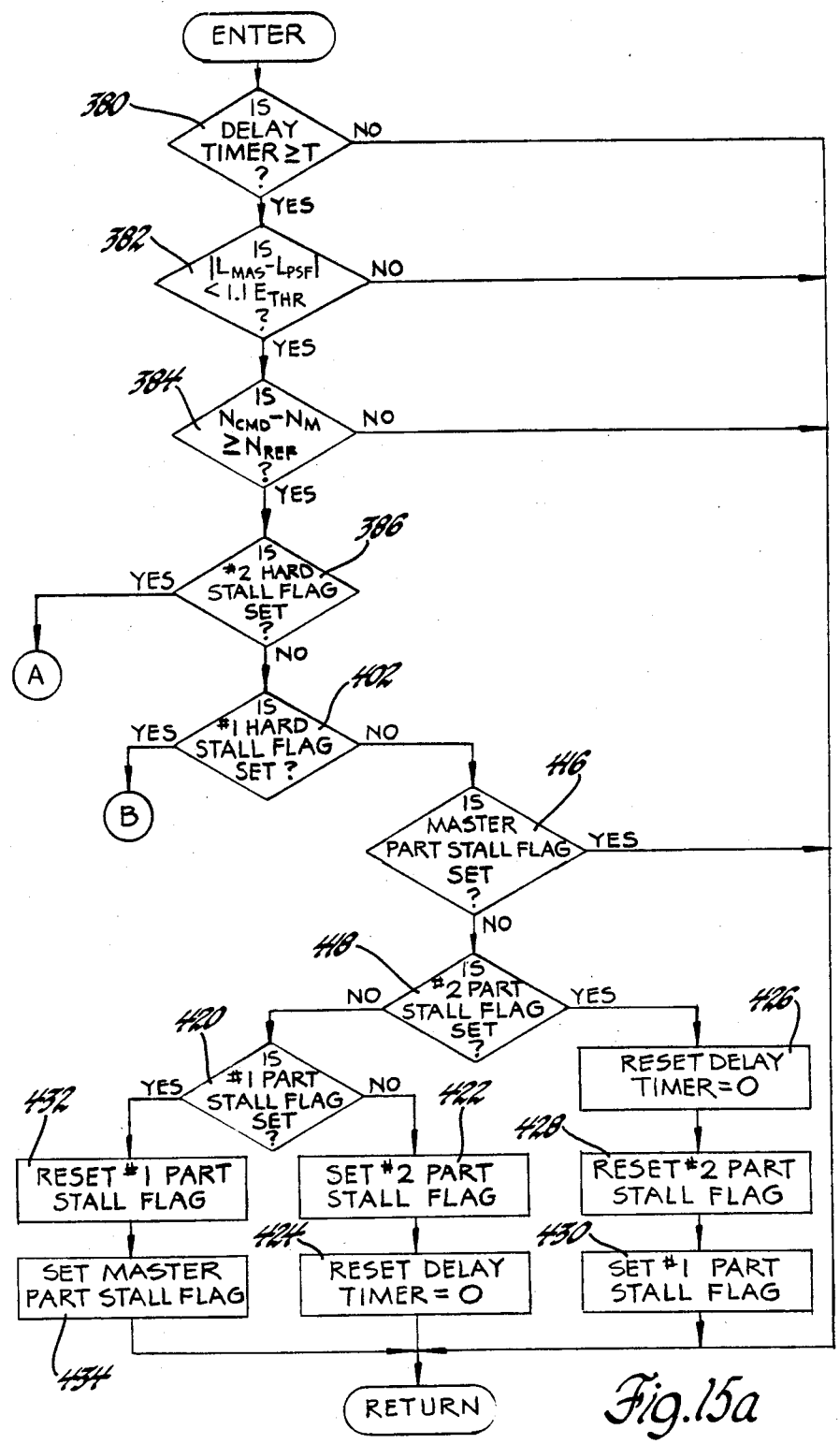
Figure 15B:
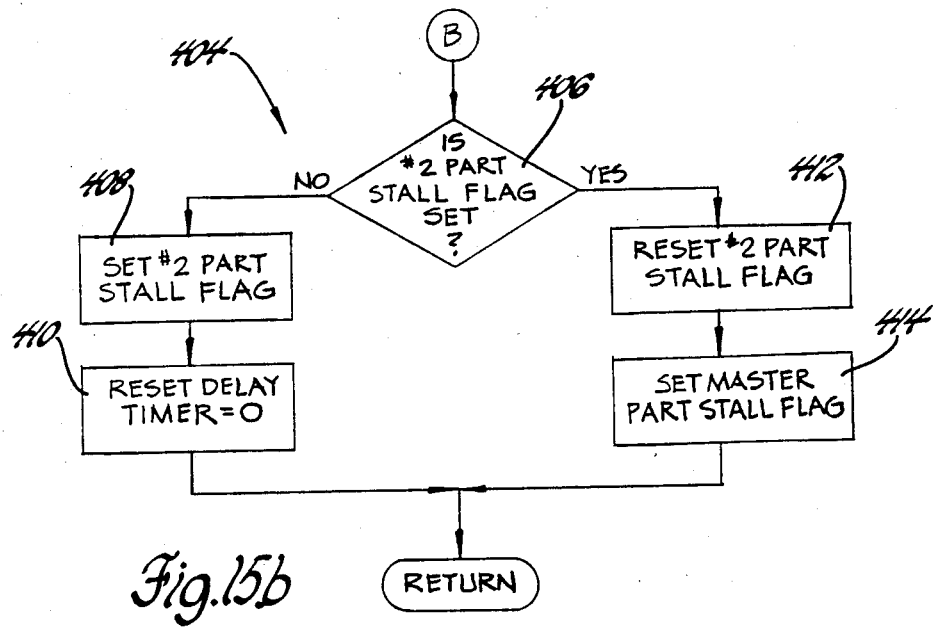
Figure 15C:
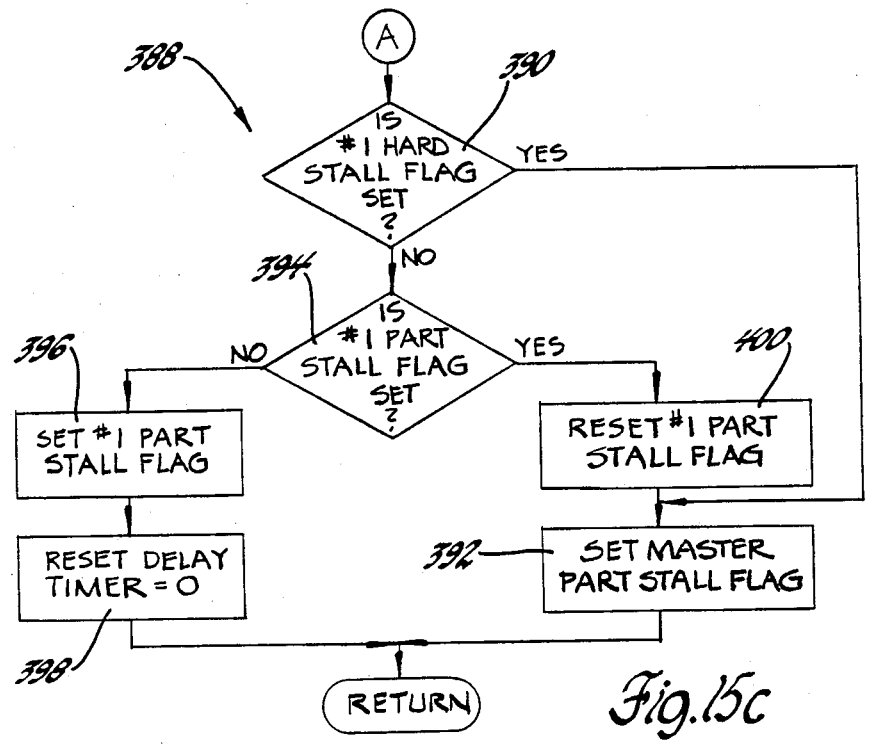

As indicated above, the flow diagrams of FIGS. 14a–14b and 15a–15c pertain to a three-fan embodiment as generally designated by the reference numeral 16 in FIG. 1a or 22 in FIG. 2a in which no slave fan blades are in meshing engagement with the master fan blades. The slave fan synchronization logic of FIGS. 14a–14b serves in such installations to first bring one of the slave fans into synchronization with the master and thereafter to control the master to bring the second slave fan into synchronism with the master and the first slave fan. If one of the slave fans stalls, the operating speed of the remaining two fans is increased by approximately 30%. If both slave fans are stalled, the master fan is increased by approximately 60%. The part stall logic of FIGS. 15a–15c is effective in part stall conditions to logically deduce which fan is causing the part stall condition and to suitably control the remaining two fans.

Referring now to the slave fan synchronization logic of FIGS. 14a–14b, the blocks 320–326 are first executed substantially as described above in reference to FIG. 12a to ascertain movement of the master fan, to skip execution of the synchronization routine on the first execution of the routine after the initiation of motor operation, and to determine if the SLAVE #2 PART STALL flag is set. If the SLAVE #2 PART STALL flag is set, the instruction blocks 328 and 336 are executed to designate the slave #1 fan as the primary slave fan and to progressively increase the commanded motor speed $N_{cmd}$ by approximately 30%. Then, the flow diagram portion designated generally by the reference numeral 330 is executed as analogously set forth in reference to FIGS. 10a–10b and 12a–12b to determine the phase error $E_P$ between the master and slave #1 fan and to adjust the commanded motor speed $N_{cmd}$ to effect synchronism therebetween. The status of the SLAVE #2 PART STALL flag is determined by the part stall logic of FIGS. 15a–15c described below.

If the SLAVE #2 PART STALL flag is not set, the decision block 332 is executed to determine if the SLAVE #1 PART STALL flag is set. If so, the instruction block 334 is executed to designate the slave #2 fan as the primary slave fan. Then, as indicated by the circled letter C, the instruction block 336 and the flow diagram portion 330 are executed to synchronously increase the speed of the master and slave #2 fans by approximately 30%.

If neither the SLAVE #1 PART STALL flag nor the SLAVE #2 PART STALL flag is set, the decision block 338 is executed to determine if the SLAVE #1 ACQUIRED flag is set. If so, the slave #1 fan is rotating and the instruction block 340 is executed to reset the SLAVE #1 HARD STALL flag and to designate the slave #1 fan as the primary slave fan. Thereafter the instruction block 342 is executed to determine the phase error $E_P$ between the master and slave #1 fans and the phase error threshold $E_{THR}$. If the absolute value of the phase error $E_P$ is greater than the phase error threshold $E_{THR}$ as determined at decision block 344 of FIG. 14b, the blocks 346–354 are executed as described above to adjust the commanded motor speed $N_{cmd}$ for bringing the master and slave #1 fans into synchronism.

If the decision block 344 is answered in the affirmative, the master and slave #1 fans are are rotating in substantial synchronism and the decision block 356 is executed to determine if the SLAVE #2 ACQUIRED flag is set. If not, the slave #2 fan is stalled and the instruction blocks 358 and 336, and the flow diagram portion 330 are executed to set the SLAVE #2 HARD STALL flag and to synchronously increase the master and #1 slave fan speeds by approximately 30%.

If the decision block 356 is answered in the affirmative, the slave #2 fan is rotating and the instruction blocks 360 and 362 are executed to designate the slave #2 fan as the primary slave fan and to reset SLAVE #2 HARD STALL flag. Thereafter the flow diagram portion 330 is executed to adjust the commanded motor speed $N_{cmd}$ as required to bring the slave #2 fan into synchronism with the master and slave #1 fans.

If the decision block 338 of FIG. 14a is answered in the negative, indicating that the slave #1 fan is not rotating, the instruction block 364 is executed to set the SLAVE #1 HARD STALL flag and the decision block 366 is executed to determine if the SLAVE #2 ACQUIRED flag is set. If not, both slave fans are stalled, and the instruction blocks 368 and 370 of FIG. 14b are executed to set the SLAVE #2 HARD STALL flag, and to progressively increase the commanded motor speed $N_{cmd}$ by approximately 60%. Thereafter, the execution of the flow diagram portion 330 is skipped as indicated by the flow diagram line 372 since only the master fan is operable.

If the decision block 366 is answered in the affirmative, the slave #2 fan is rotating, and the instruction blocks 374 and 376 are executed to designate the slave #2 fan and the primary slave fan and to reset the SLAVE #2 HARD STALL flag. Thereafter, the instruction block 336 and the flow diagram portion 330 are executed to synchronously increase the master and slave #2 fan speeds by approximately 30%.

Referring now to the part stall logic of FIGS. 15a–15c, the decision blocks 380–384 of FIG. 15a are first executed as described above in reference to FIGS. 9, 11 and 13 to determine at the termination of a suitable delay period following initiation of motor operation if the master and primary slave fans are rotating at substantial synchronism and if the master fan speed $N_M$ is within $N_{REF}$ of the commanded motor speed $N_{cmd}$. If the blocks 380–384 are all answered in the affirmative, a part stall condition is in effect and the decision block 386 is executed to determine if the SLAVE #2 HARD STALL flag is set. If so, the flow diagram portion designated generally by the reference numeral 388 in FIG. 15c is executed as indicated by the circled letter A to logically determine if the slave #1 fan or the master fan is causing the stall.

Referring to the flow diagram portion 388, the decision block 390 is first executed to determine if the SLAVE #1 HARD STALL flag is set. If so, only the master fan is rotating and the instruction block 392 is executed to set the MASTER PART STALL flag. This serves to permit continued operation of the master fan limited only by the current limiting of the motor controller 32 and to warn the operator of the vehicle of the reduction in cooling capacity so that system repair may be effected as soon as possible.

If the decision block 390 is answered in the negative, the slave #1 fan is rotating and the decision block 394 is executed to determine if the SLAVE #1 PART STALL flag is set. Initially, such flag will not be set and the instruction blocks 396 and 398 are executed to set the SLAVE #1 PART STALL flag and to reset the DELAY TIMER to zero. If the part stall condition is still in effect upon termination of the delay period T, the decision block 394 will be reexecuted and answered in the affirmative. In such case, the slave #1 fan is not the cause of the part stall condition and the instruction blocks 400 and 392 are executed to reset the SLAVE #1 PART STALL flag and to set the MASTER PART STALL flag. As indicated above, this permits the master and slave #1 fans to continue rotating limited only by the current limiting of the motor controller 32, and warns the operator of the vehicle of the reduction in cooling capacity so that system repair may be effected as soon as possible.

If the slave #2 fan is not stalled, the decision block 386 of FIG. 15a will be answered in the negative and the decision block 402 is executed to determine if the SLAVE #1 HARD STALL flag is set. If the SLAVE #1 HARD STALL flag is set, the flow diagram portion designated generally by the reference numeral 404 in FIG. 15b is executed as indicated by the circled letter B to logically determine which of the master or slave #2 fans is causing the part stall condition. The decision block 406 is first executed to determine if the SLAVE #2 PART STALL flag is set. Initially such flag will not be set and the instruction blocks 408 and 410 are executed to set the SLAVE #2 PART STALL flag and to reset the DELAY TIMER to zero. If the stall condition is still in effect upon termination of the delay period T, the decision block 406 will be reexecuted and answered in the affirmative. In such event the slave #2 fan is not the cause of the stall condition and the instruction blocks 412 and 414 are executed to reset the SLAVE #2 PART STALL flag and to set the MASTER PART STALL flag. As indicated above, this permits continued operation of the master and slave #2 fans limited only by the current limiting of the motor controller 32, and warns the operator of the vehicle of the reduced cooling capacity so that system repair may be effected as soon as possible.

If neither of the slave fans is experiencing a hard stall condition, the decision blocks 416–420 of FIG. 15a are executed to determine if the MASTER PART 20 STALL flag, the SLAVE #2 PART STALL flag or the SLAVE #1 PART STALL flag is set. Initially, none of the flags will be set and the instruction blocks 422 and 424 are executed to set the SLAVE #2 PART STALL flag and to reset the DELAY TIMER to zero on the assumption that the slave #2 fan is the cause of the stall. In such case the synchronization logic of FIGS. 14a–14b designates the slave #1 fan as the primary slave fan and brings it into synchronization with the master fan if possible. If the part stall condition is still in effect upon termination of the delay period T, the decision block 418 will be reexecuted and answered in the affirmative. In such event the instruction blocks 426–430 are executed to reset the SLAVE #2 PART STALL flag, to set the SLAVE #1 PART STALL flag and to reset the DELAY TIMER to zero. This causes the synchronization logic of FIGS. 14a–14b to designate the slave #1 fan as the primary slave fan and to attempt to bring it into synchronization with the master fan through adjustment of the commanded motor speed $N_{cmd}$. If the part stall condition is still in effect upon termination of the delay period T, the decision block 420 will be reexecuted and answered in the affirmative. In such event the instruction blocks 432 and 434 are executed to reset the SLAVE #1 PART STALL flag and to set the MASTER PART STALL flag. As indicated above, this permits continued operation of all three fans limited only by the current limiting of the motor controller 32 and warns the operator of the vehicle of the reduced cooling capacity so that system repair may be effected as soon as possible.

A motor controller meeting the requirements of the motor controller 32 of FIG. 5 is depicted in FIGS. 16a–16c. It receives a PWM input on line 34 in relation to the motor speed command $N_{cmd}$. The duty cycle (%DC) of the PWM input, and therefore its average input voltage, is directly proportional to the commanded speed ($N_{cmd}$), as generally designated in the graph of FIG. 16a. Duty cycles ranging from 0% to 95% correspond to commanded motor speeds ranging from a minimum speed ($N_{min}$) to a maximum speed ($N_{max}$). A duty cycle of 95% or greater corresponds to a commanded motor speed of zero.

As seen in FIG. 16b, the motor speed command input is applied to the line 500 via the resistor 502, and is used, as will later be described, to modulate the conduction of power transistors 528–532 so that the actual motor speed $N_{act}$ corresponds with the commanded speed $N_{cmd}$.

The master fan motor is generally designated by the reference numeral 510. The motor 510 comprises three WYE-connected phase windings 512a, 512b, and 512c wound on a stationary six-pole stator core 514, and a two-pole permanent magnet rotor 516 disposed thereabout. The rotor 516 also carries a two-pole phasing magnet 518 which cooperates with three stationary and equally spaced Hall effect devices $H_a$, $H_b$ and $H_c$ to provide rotor position information on the lines 520, 522, and 524.

The phase windings 512a–512c are adapted to be energized with current from an automotive storage battery 526 via line 527 and a three-phase half-wave inverter comprising three power MOSFET transistors 528, 530 and 532. As will later be explained, the conduction of the power transistors 528, 530 and 532 is controlled via the lines 534–536 and the resistors 537–539 in accordance with the rotor position information on lines 520, 522, and 524 to produce positive motor torque for advancing the rotor 516 in the forward direction. To protect the transistors 528–530, the inductive energy stored in the phase windings 512a–512c upon deenergization is directed via the diodes 540, 542 and 544 to an energy catch network comprising the capacitor 546 and the resistor 548. Energy directed to the network upon deenergization of a given phase winding is stored in the capacitor 546 and subsequently returned to another phase winding in its energization period. The drain-to-source voltage drop across each power transistor 528, 530, 532 is detected by a respective R-C network 550, 552, 554 to provide an electrical indication on lines 556, 558 and 560 of the current conducted through the respective transistors.

The logic circuit 584 is a custom gate array device used to implement various circuit elements for controlling the conduction of power transistors 528–532. The primary circuit elements of logic circuit 584 are set forth in FIG. 16c. The inputs to logic circuit 584 include the speed command on lines 500, the rotor position information on lines 520–524, and the transistor current information on lines 556–560. In response to the various inputs, the logic circuit 584 outputs conduction control signals to the power transistors 528-532 via the lines 534-536.

The storage battery 526 supplies power to the logic circuit 584 directly via a filter and wake-up circuit designated generally by the reference numeral 586. The filter and wake-up circuit 586 operate to filter the battery voltage and to prevent substantial discharging of the battery 526 when motor operation is not required. Capacitor 582 filters the battery voltage, and PNP transistor 594 is effective when rendered conductive to apply the filtered battery voltage to the logic circuit 584 on line 596 via the series resistor 598 and the shunt Zener diode 600 and capacitor 602. The conduction of transistor 594 is controlled by an R-C network comprising the capacitor 604 and the resistors 606-610. The series resistors 606 and 608 connect the base of transistor 594 to the motor speed command line 34 and the capacitor 604 is connected between the resistor junction 612 and the emitter of transistor 594. The resistor 610 is connected across the base-emitter junction of transistor 594.

In operation, the resistor 610 biases the transistor 594 to its normally nonconductive state, isolating battery voltage from the logic circuit 584. In such state, the drain on the battery 526 is limited primarily to the leakage current of transistor 594—about 400 uA. Whenever the motor speed command on line 34 is at a logic zero voltage potential, the capacitor 604 is charged through the battery 526 and the resistor 608. When the capacitor 604 is sufficiently charged, the base-emitter junction of transistor 594 becomes forward biased, and the filtered battery voltage is applied to the logic circuit 584. The capacitor 604 and resistors 606-610 are sized such that the transistor 594 is forward biased whenever the duty cycle of the signal applied to line 34 is less than approximately 95%. When the duty cycle of the signal exceeds approximately 95%, indicating that the motor speed command $N_{cmd}$ is zero, the capacitor 604 discharges through the base-emitter junction of transistor 594 and the resistors 606 and 610 and thereafter, the transistor 594 ceases to conduct.

As indicated above, FIG. 16c sets forth the logic circuit 584 of FIG. 16b in greater detail. Accordingly, the input and output lines have been assigned the same reference numerals as in FIG. 16b. Essentially, the logic circuit 584 comprises a motor drive circuit 620 which energizes the phase windings 512a-512c in accordance with the rotor position information on lines 520-524, and various other elements and circuits which modulate the phase winding energization so as to control the motor speed and to protect the power transistors 528-532 during overcurrent conditions. The input battery voltage is referred to in FIG. 16c as $V_{DD}$, and a lower voltage used by various circuits is referred to as $V_{CC}$. The voltage $V_{CC}$ is obtained from $V_{DD}$ with a simple voltage regulator comprising a series resistor 622 and a shunt Zener diode 624, as shown.

Referring to the motor drive circuit 620, the rotor position signals on lines 520-524 are connected as inputs to a ring counter comprising the NOR gates 640-644. Pull-up resistors 632-636 connect the lines 520-524 to the voltage $V_{CC}$ to normally maintain the respective signals at a logic one voltage potential. The outputs of the ring counter are connected through the inverters 646-650 as inputs to the NOR gates 652-656, the other input of each such gate being connected to the modulation signal line 658. The outputs of the NOR gates 652-656 are connected, in turn, to the power transistor driver circuits 660-664 through open-collector gates 666-670.

The driver circuits 660-664 are identical; each comprises a pair of totem-connected transistors 672-676 normally biased by the gates 666-670 to prevent conduction of the respective power transistor. When the output of a NOR gate 652-656 assumes a logic one voltage potential, the respective gate 666-670 reverts to an open-collector state, and a pull-up resistor 678-682 biases the respective driver circuit 660-664 to drive the respective power transistors 528-532 into conduction for energizing a phase winding.

Included within the motor drive circuit 620, but logically separate therefrom, are the comparators 690, 692 and 694. Essentially, the comparators 690-694 compare the power transistor drain-to-source voltage drop signals on lines 556-560 with a reference voltage defined on line 696 by the voltage divider resistors 698 and 700. The open collector gates 702-706 ensure that the voltage signals are maintained low when the respective power transistor 528-532 is biased nonconductive. Normally, the drain-to-source voltage drop is less than the reference voltage, and the comparator outputs assume a logic zero voltage level. However, if the current conducted through the drain-to-source junction of a given power transistor exceeds a maximum safe operating level, drain-to source voltage drop will exceed the reference voltage on line 696 and the output of the respective comparator 690-694 will assume a logic one voltage potential. The outputs of the comparators 690-694 are connected as inputs to the OR gate 708 so that if the current conducted through one or more of the power transistors 528-532 is above a safe maximum operating level, the output of OR gate 708 on line 709 rises to a logic one voltage potential.

As indicated above, the modulation signal on line 658 is used to modulate the normal energization of the phase windings 512a-512c for the purpose of speed control and power transistor protection during overcurrent conditions. When the motor is running at normal operating speeds, and the power transistors are operating at a safe current level, the state or duty cycle of the modulation signal is controlled in response to the speed command signal on line 500. The speed command signal is applied through a diode 710, a voltage divider comprising the resistors 711 and 712, and the resistor 718 to the inverting input of a comparator 716. A filter capacitor 714 is connected between the inverting input and ground. The diode 710 provides isolation and the resistor 718 provides controlled acceleration time. The non-inverting input of the comparator 716 is connected to a 20 kHz triangular voltage signal generated by a generally conventional oscillator circuit 720 on line 722. Accordingly, the output of the comparator 716 is modulated on and off at a rate which is proportional to the duty cycle of the speed command signal $N_{cmd}$ on line 500. The output of comparator 716 is applied to the modulation signal line 658 through the OR gate 724 so as to likewise modulate the phase winding energization.

A generally conventional current limit circuit 726 is responsive to the phase winding overcurrent signal on line 709, and is effective in the event of an overcurrent condition to reduce the average winding current for protecting the motor and control unit. Whenever the logic level on line 709 indicates the presence of an overcurrent condition, the output line 728 of current limit circuit 726 is toggled to a logic one state for a predetermined interval, such as 40 usec. This overrides the comparator 716 and the OR gate 724, and serves to intermittently interrupt the energization of the motor phase windings in the presence of a persistent overcurrent condition.

While this invention has been described in reference to the illustrated embodiments, it should be understood that various modifications thereto will occur to those skilled in the art, and that systems incorporating such modifications may fall within the scope of this invention, which is defined by the appended claims.

We claim: The embodiments of the invention in which an exclusive property or privilege is claimed are defined as follows:

1. A motor vehicle cooling fan drive apparatus comprising:
   first and second juxtaposed and magnetically coupled rotary cooling fans;
   drive means including an electric motor connected to rotatably drive said first cooling fan, and motor controller means connected to said electric motor for controlling its running speed in accordance with the value of a speed command signal applied thereto; and
   system control means including means for (1) generating a desired speed value for said fans in accordance with the vehicle cooling demand, (2) determining a phase error $E_P$ according to the relative rotary positions of said first and second fans, (3) adjusting said desired speed value in a direction to reduce said phase error $E_P$ at least when said phase error is greater than a threshold error, and (4) applying a speed command signal to said motor controller means in accordance with the adjusted speed value, thereby to control said electric motor for synchronously accelerating and running said first and second fans at said desired speed value.

2. The apparatus set forth in claim 1, wherein the system control means includes means for determining the rate of change of the determined phase error, and wherein the adjustment of said desired speed value is determined in relation to such rate of change.

3. The apparatus set forth in claim 1, wherein the first and second fans include radially extending blades which are partially interleaved with each other, and wherein the system control means includes means for (1) detecting as tall condition in which the second fan fails to rotate after the electric motor has been controlled to rotate the first fan, and (2) preventing further energization of said motor so long as such condition persists.

4. The apparatus set forth in claim 1, wherein the first and second fans are separately rotatable without causing mechanical interference between their respective blades, and wherein said system control means includes means for (1) detecting a stall condition in which the second fan fails to rotate after the electric motor has been controlled to rotate the first fan, (2) increasing said desired speed value to compensate for the loss of said second fan, and (3) preventing further adjustment of said desired speed value in relation to a determined phase error so long as the detection of such stall condition persists.

5. The apparatus set forth in claim 1, wherein the first and second fans are separately rotatable without causing mechanical interference between their respective blades, and wherein said system control means includes means for (1) detecting a partial stall condition in which the first and second fans are rotating in substantial synchronism, but at a speed significantly less than said desired speed value, (2) preventing further adjustment of sad desired speed value in relation to a determined phase error so long as the detection of such partial stall condition persists, and (3) increasing said desired speed value to compensate for the partial loss of said second fan.

6. The apparatus set forth in claim 1, wherein the first and second fans are separately rotatable without causing mechanical interference between their respective blades, and wherein said system control means includes means effective during a partial stall condition in which the first and second fans are rotating in substantial synchronism, but at a speed significantly less than said desired speed value for inhibiting further adjustment of said desired speed value in relation to a determined phase error for at least a predetermined interval, and if the partial stall condition alleviated at the expiration of such interval, increasing said desired speed value to compensate for the partial loss of said second fan and continuing said inhibit so long as said partial stall condition persists.

7. The apparatus set forth in claim 1, wherein the first and second fans are separately rotatable without causing mechanical interference between their respective blades, and wherein said system control means includes means effective durin a partial stall condition in which the first and second fans are rotating in substantial synchronism, but at a speed significantly less than said desired speed value for inhibiting further adjustment of said desired speed value in relation to a determined phase error for at least a predetermined interval, and if the partial stall condition is still in effect at the expiration of such interval, indicating the existence of reduced system cooling capacity so long as said partial stall condition persists.

8. A motor vehicle cooling fan drive apparatus comprising:
   a master cooling fan connected to be rotatably driven by an electric motor;
   motor controller means connected to said electric motor for controlling its running speed in accordance with the value of a speed command signal applied thereto;
   first and second slave fans juxtaposed and magnetically coupled to said master cooling fan; and
   system control means including means for (1) generating a desired speed value for said fans in accordance with the vehicle cooling demand, (2) determining a phase error $E_P$ according to the relative rotary positions of said master fan and said first slave fan, (3) adjusting said desired speed value in a direction to reduce said phase error $E_P$ at least when said phase error is greater than a threshold error, and (4) applying a speed command signal to said motor controller means in accordance with the adjusted speed value, thereby to control said electric motor for synchronously accelerating and running said master and first slave fans at said desired speed value.

9. The apparatus set forth in claim 8, wherein said master and first slave fans include radially extending blades which are partially interleaved with each other, and wherein the system control means includes means for (1) detecting a stall condition in which the first slave fan fails to rotate after the electric motor has been controlled to rotate the master fan, and (2) preventing further energization of said motor so long as such condition persists.

10. The apparatus set forth in claim 8, wherein said master and first slave fans include radially extending blades which are partially interleaved with each other, and wherein the system control means includes means for (1) detecting a stall condition in which the second slave fan fails to rotate after the electric motor has been controlled to rotate the master fan, and (2) increasing said desired speed value to compensate for the loss of said second slave fan so long as the detection of such stall condition persists.

11. The apparatus set forth in claim 8, wherein said system control means includes means effective so long as said master and first slave fans are rotating in substantial synchronism for (1) determining said phase error $E_P$ according to the relative rotary positions of said master fan and said second slave fan, (2) adjusting said desired speed value in a direction to reduce such phase error $E_P$ at least when such phase error is greater than said threshold error, thereby to control said electric motor for synchronously accelerating said master fan and said first and second slave fans to said desired speed value.

12. The apparatus set forth in claim 11, wherein said master and first slave fans include radially extending blades which are partially interleaved with each other, and wherein the system control means is effective during a stall condition in which the master and first slave fans are rotating in substantial synchronism, but at a speed significantly less than said desired speed value, for inhibiting further adjustment of said desired speed value in relation to the phase error between said master and second slave fans for at least a predetermined interval, and if the partial stall condition alleviated at the expiration of such interval, continuing said inhibit so long as said partial stall condition persists, and increasing said desired speed value to operate said master and first slave fans at an increased speed for compensating for the partial loss of said second slave fan.

13. A motor vehicle cooling fan drive apparatus comprising:
 a master cooling fan connected to be rotatably driven by an electric motor;
 motor controller means connected to said electric motor for controlling its running speed in accordance with the value of a speed command signal applied thereto;
 first and second slave fans magnetically coupled to said master cooling fan, but separately rotatable with respect thereto; and
 system control means including means for (1) generating a desired speed value for said fans in accordance with the vehicle cooling demand, (2) determining a phase error $E_P$ according to the relative rotary positions of said master fan and one of said first and second slave fans designated as a primary slave fan, (3) adjusting said desired speed value in a direction to reduce said phase error $E_P$ at least when said phase error is greater than a threshold error, and (4) applying a speed command signal to said motor controller means in accordance with the adjusted speed value, thereby to control said electric motor for synchronously accelerating and running said master and primary slave fans at said desired speed value.

14. The apparatus set forth in claim 13, wherein said system control means includes
 means effective when said master and primary slave fans are rotating in substantial synchronism for (1) determining said phase error $E_P$ according to the relative rotary positions of said master fan and the other of said slave fans, and (2) adjusting said desired speed value in a direction to reduce such phase error $E_P$ at least when such phase error is greater than said threshold error, thereby to control said electric motor for synchronously accelerating said other slave fan with said master fan and said primary slave fan.

* * * * *